July 5, 1927.  E. E. CLEMENT  1,635,153

SUBDIVIDED SERVICE SYSTEM OF RADIO BROADCAST DISTRIBUTION

Filed Oct. 28, 1924  15 Sheets-Sheet 1

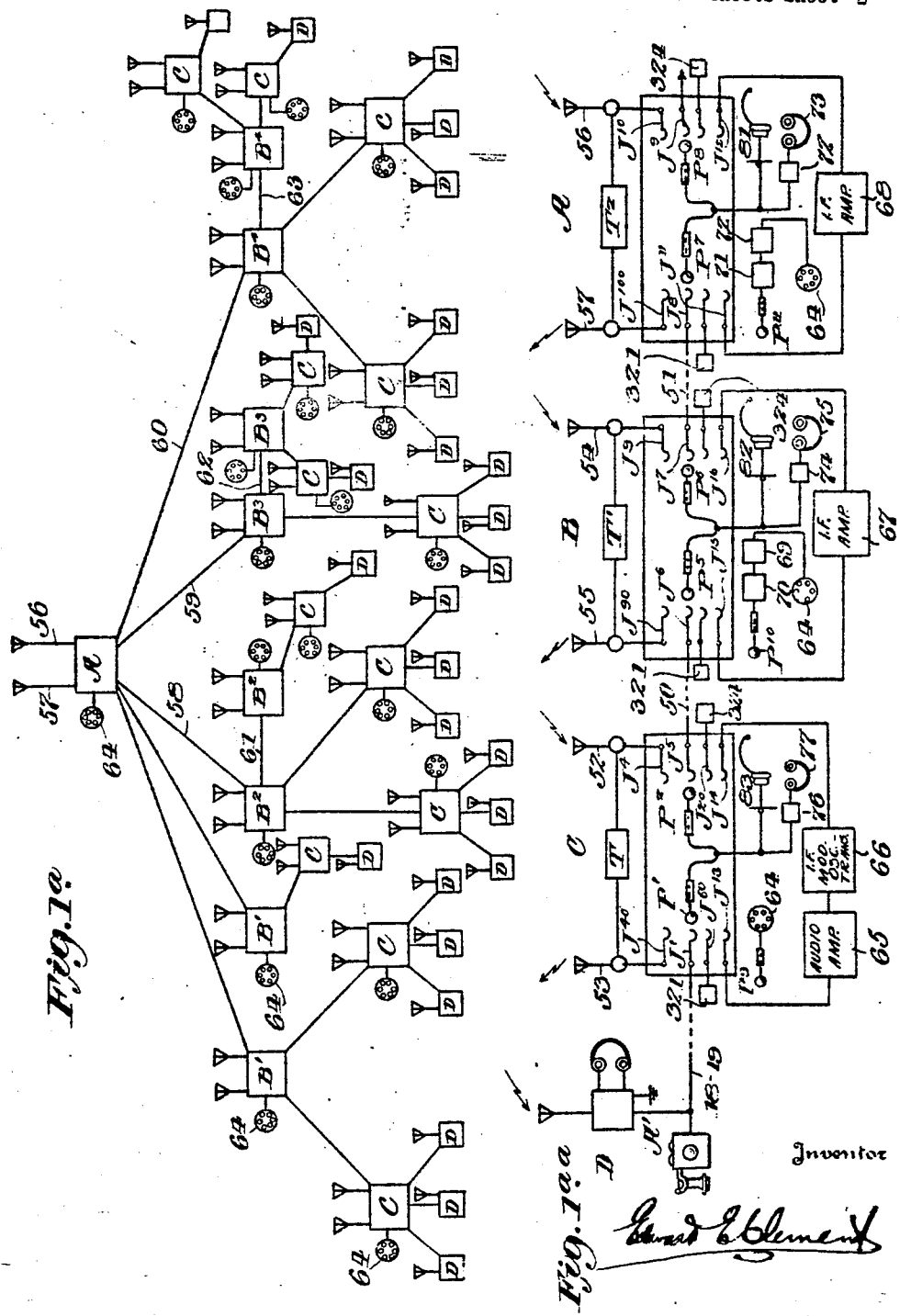

July 5, 1927.
E. E. CLEMENT
1,635,153
SUBDIVIDED SERVICE SYSTEM OF RADIO BROADCAST DISTRIBUTION
Filed Oct. 28, 1924   15 Sheets-Sheet 3
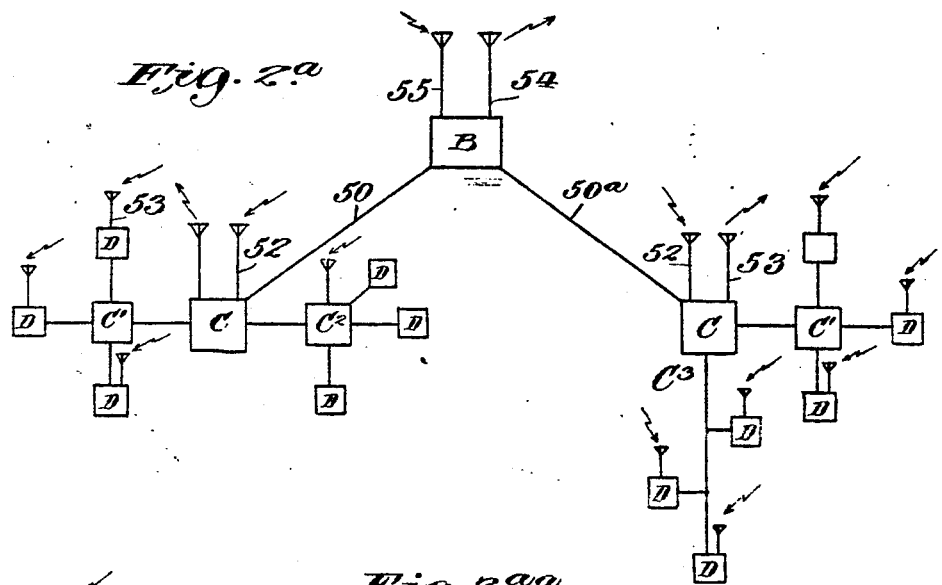
*Fig. 2ª*
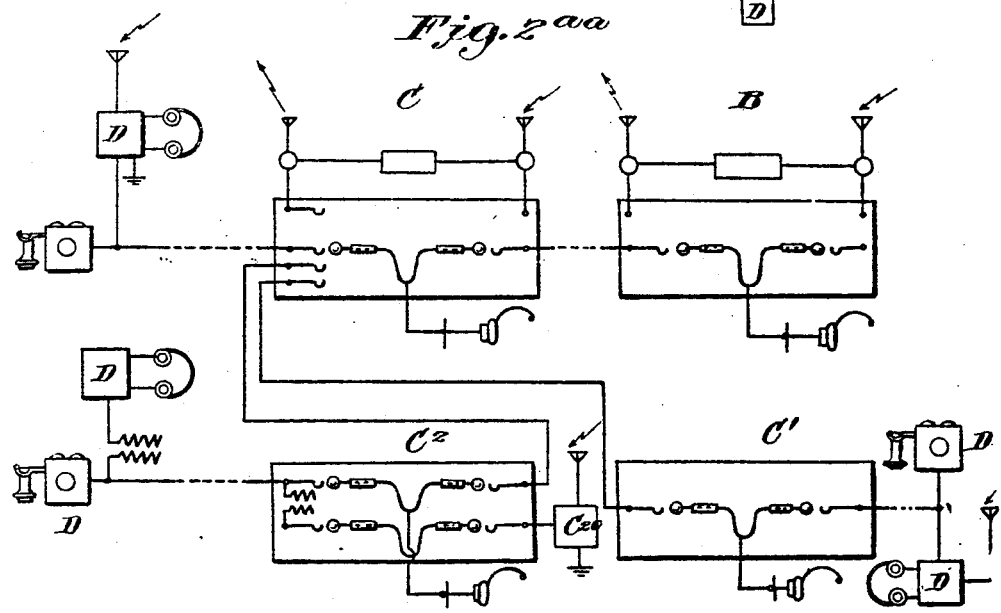
*Fig. 2ᵃᵃ*
Inventor
Edward E. Clement July 5, 1927.

E. E. CLEMENT 1,635,153

SUBDIVIDED SERVICE SYSTEM OF RADIO BROADCAST DISTRIBUTION

Filed Oct. 28, 1924 15 Sheets-Sheet 4

Fig. 5.

Inventor,
Edward E. Clement

July 5, 1927.

E. E. CLEMENT 1,635,153

SUBDIVIDED SERVICE SYSTEM OF RADIO BROADCAST DISTRIBUTION

Filed Oct. 28, 1924 15 Sheets-Sheet 5

Inventor,
Edward E. Clement

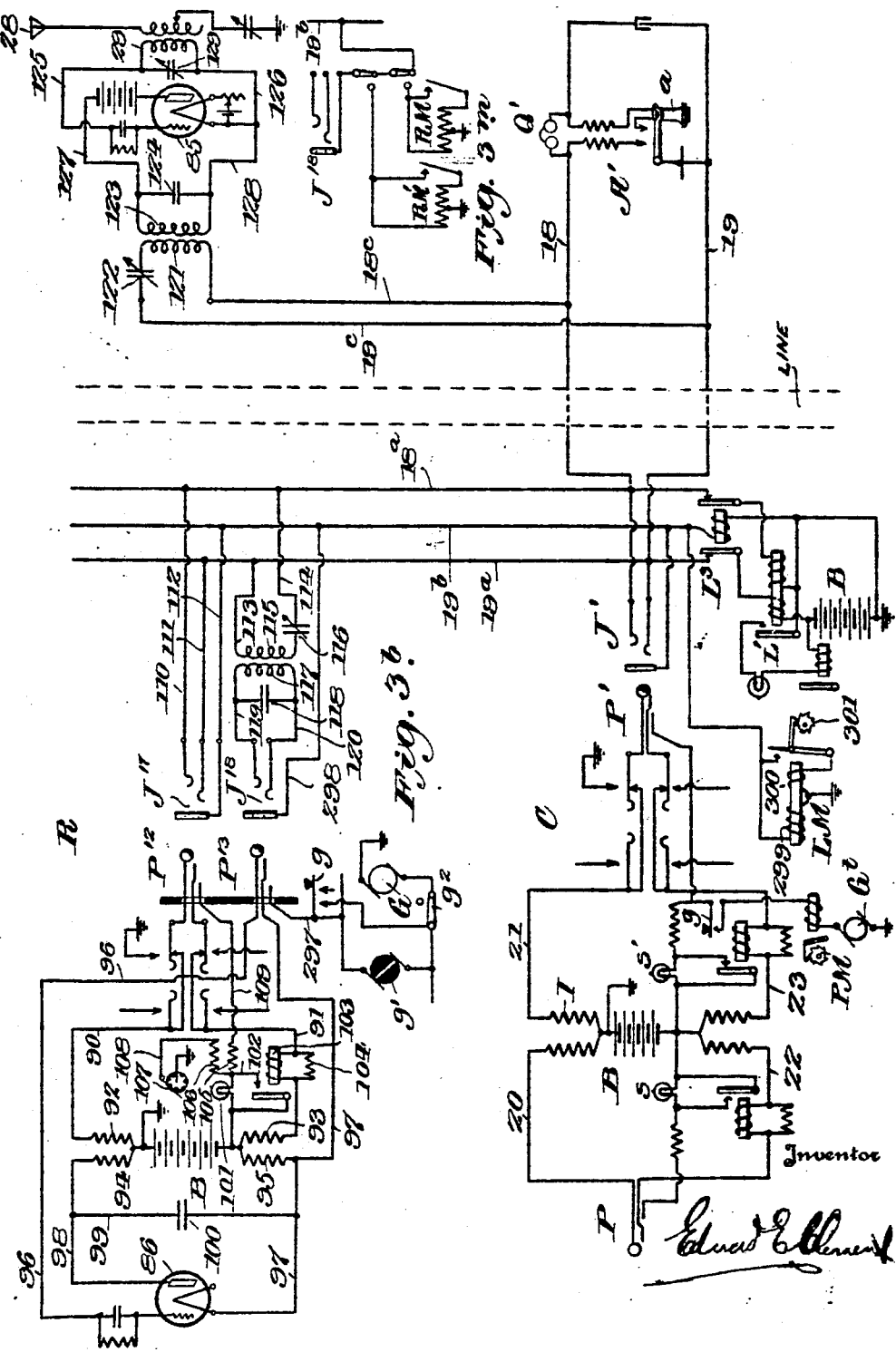

July 5, 1927.

E. E. CLEMENT 1,635,153

SUBDIVIDED SERVICE SYSTEM OF RADIO BROADCAST DISTRIBUTION

Filed Oct. 28, 1924   15 Sheets-Sheet 7

Inventor
Edward E. Clement

July 5, 1927.

E. E. CLEMENT 1,635,153

SUBDIVIDED SERVICE SYSTEM OF RADIO BROADCAST DISTRIBUTION

Filed Oct. 28, 1924 15 Sheets-Sheet 8

July 5, 1927.
E. E. CLEMENT
1,635,153
SUBDIVIDED SERVICE SYSTEM OF RADIO BROADCAST DISTRIBUTION
Filed Oct. 22, 1924     15 Sheets-Sheet 9
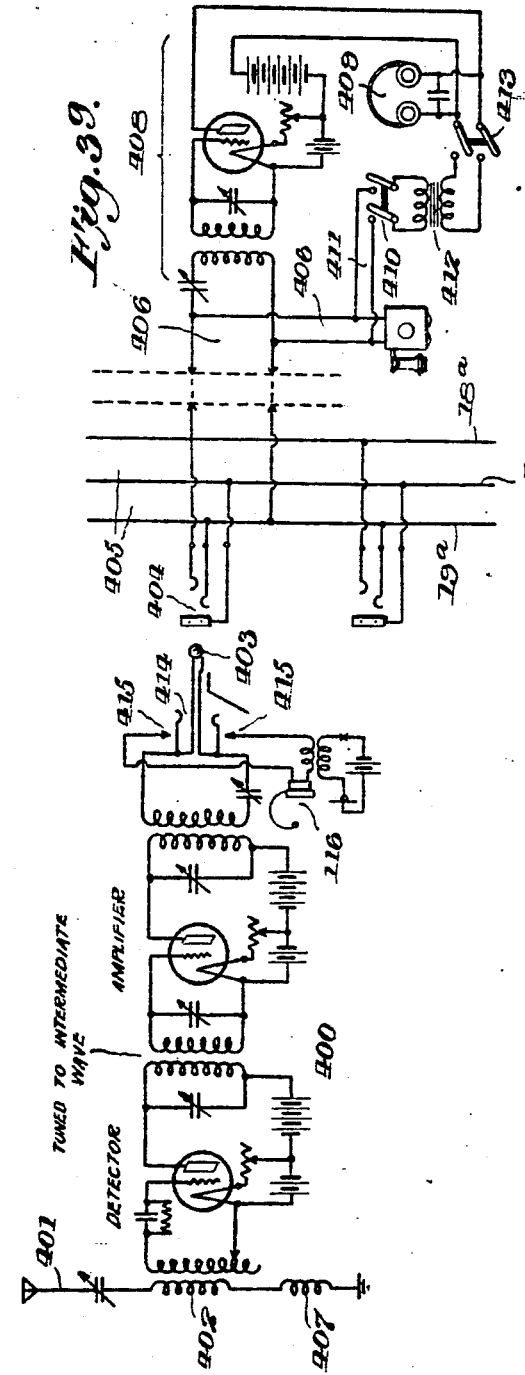
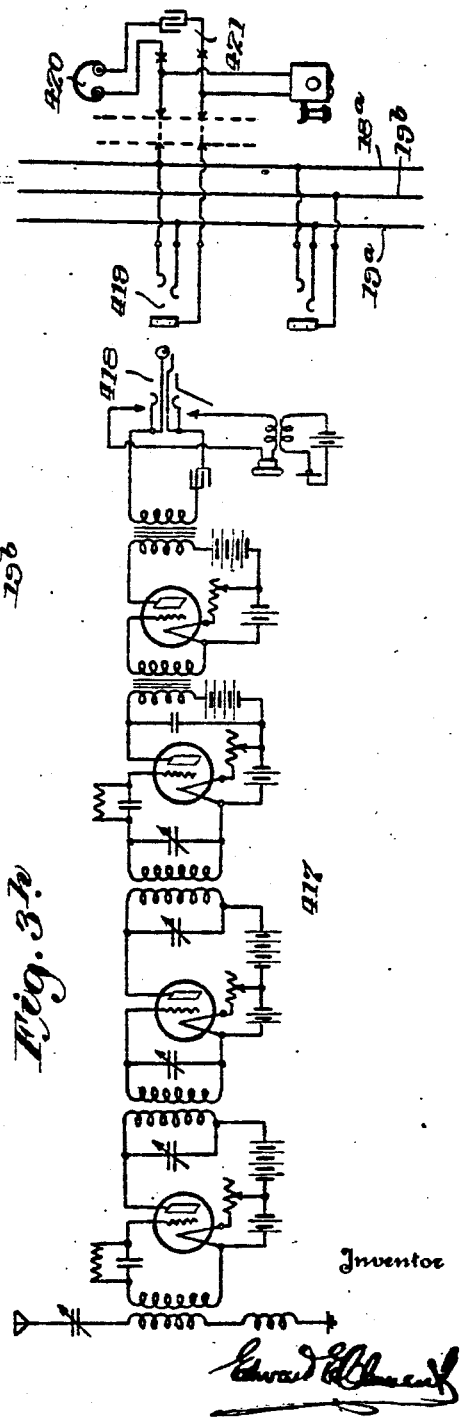

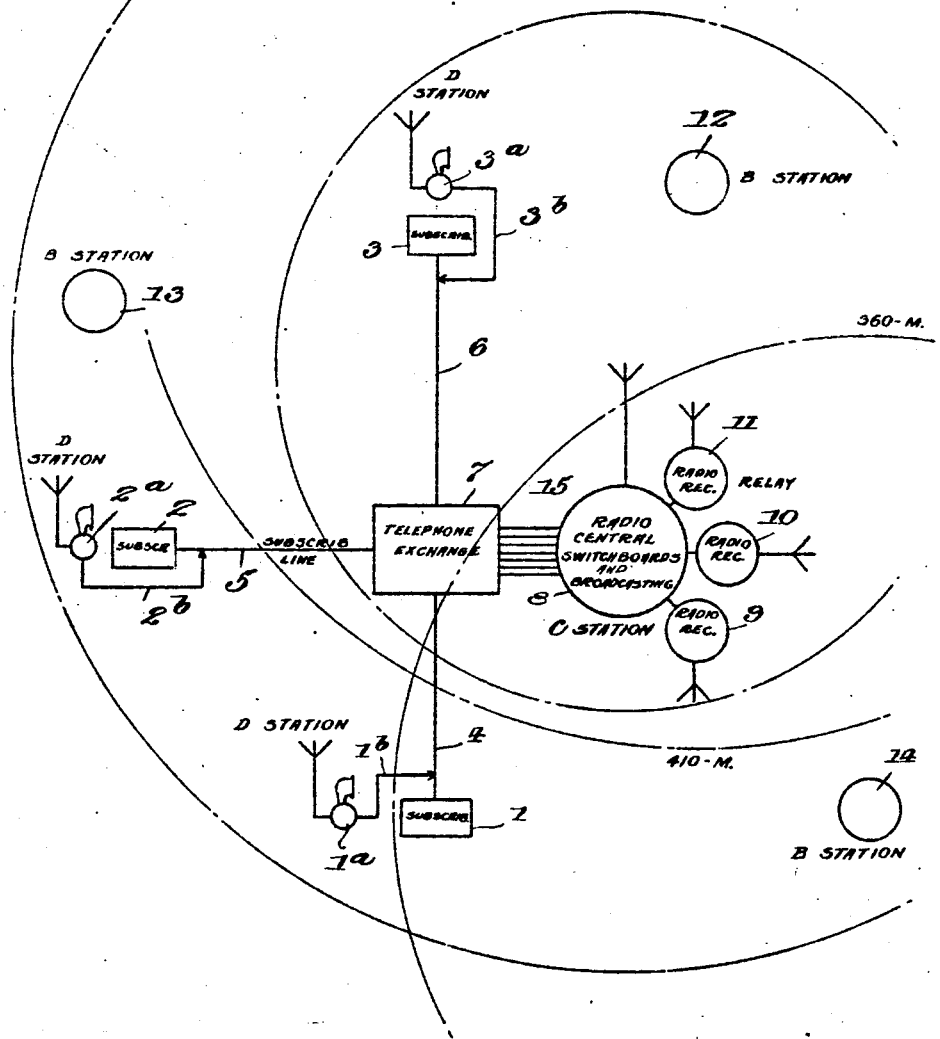

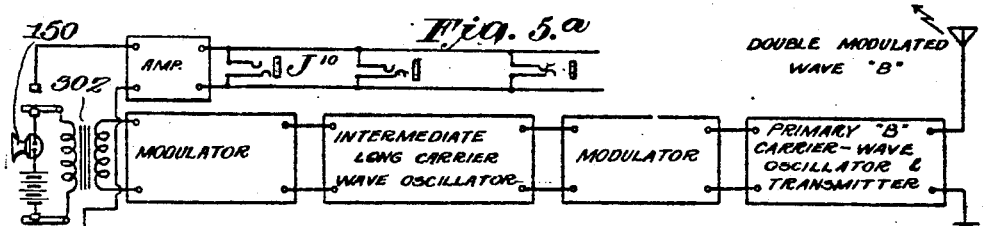

July 5, 1927.
E. E. CLEMENT
1,635,153
SUBDIVIDED SERVICE SYSTEM OF RADIO BROADCAST DISTRIBUTION
Filed Oct. 28, 1924     15 Sheets-Sheet 12
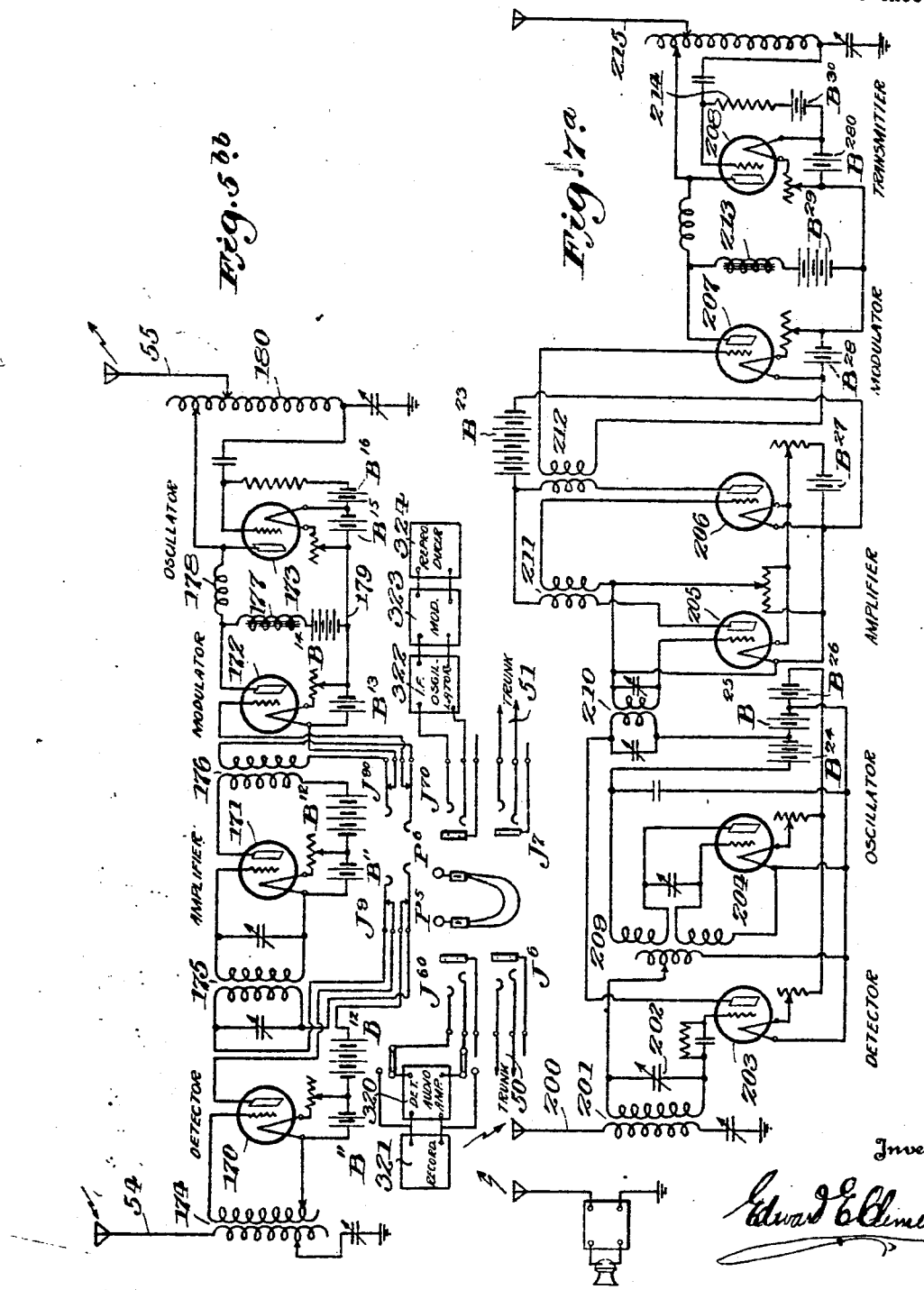
Inventor
Edward E Clement

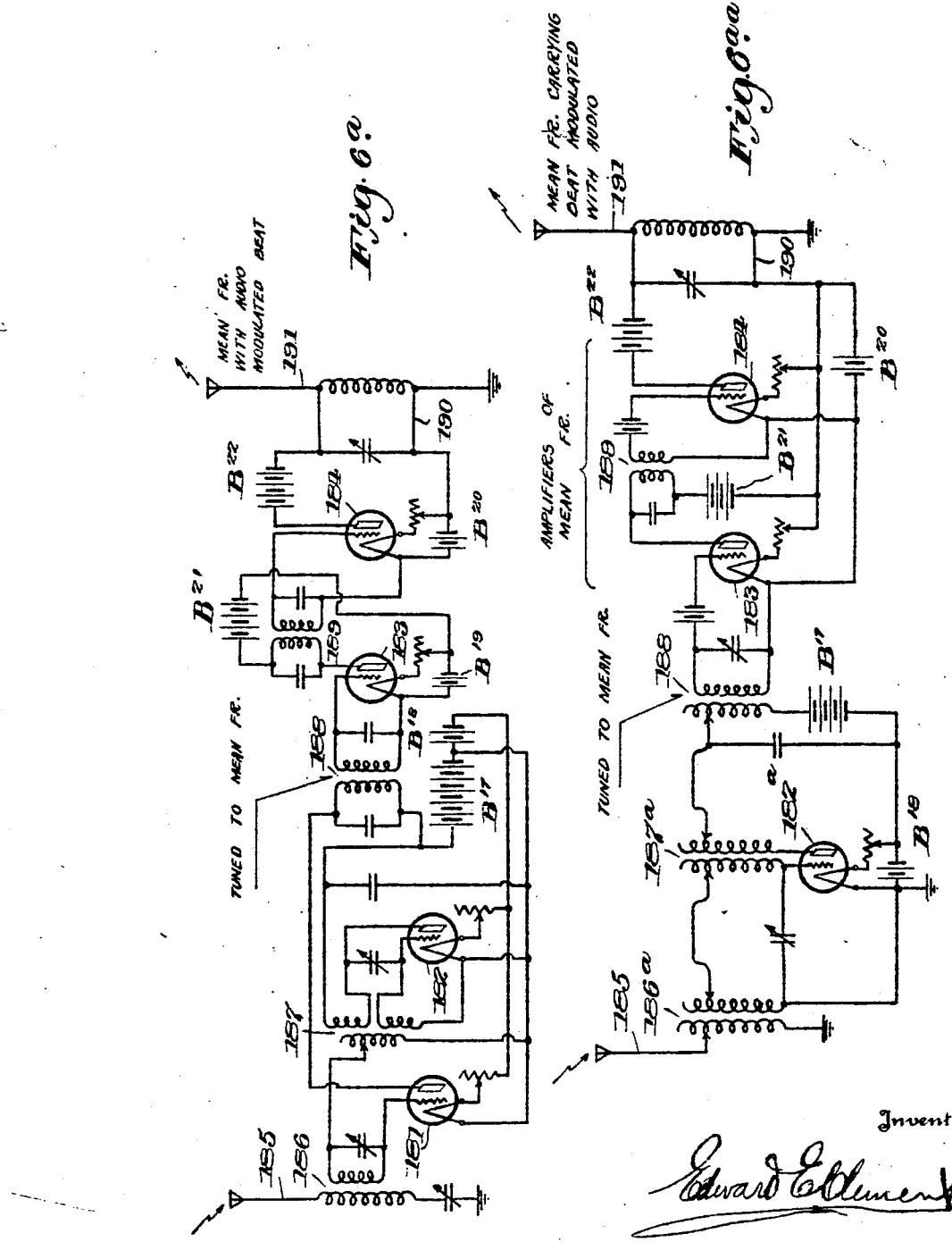

July 5, 1927.
E. E. CLEMENT
1,635,153
SUBDIVIDED SERVICE SYSTEM OF RADIO BROADCAST DISTRIBUTION
Filed Oct. 28, 1924 15 Sheets-Sheet 14
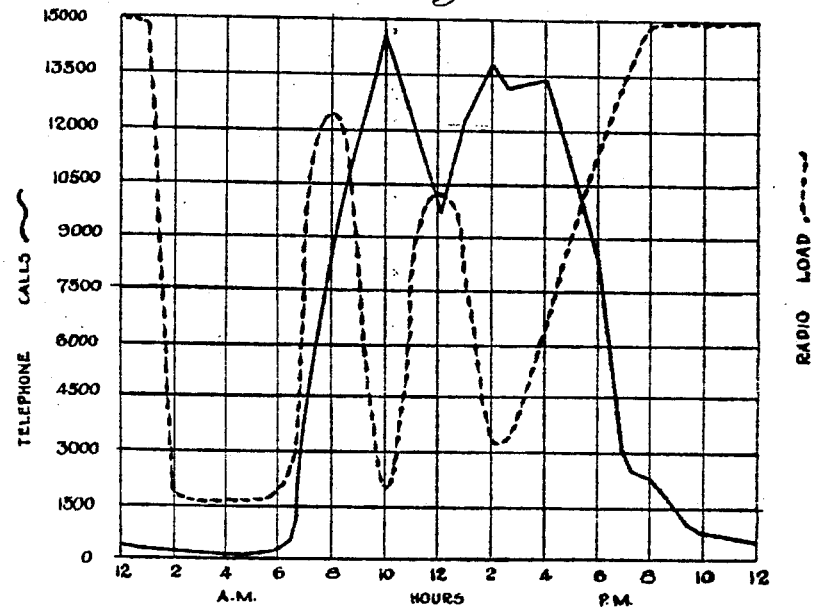
Fig. 8.
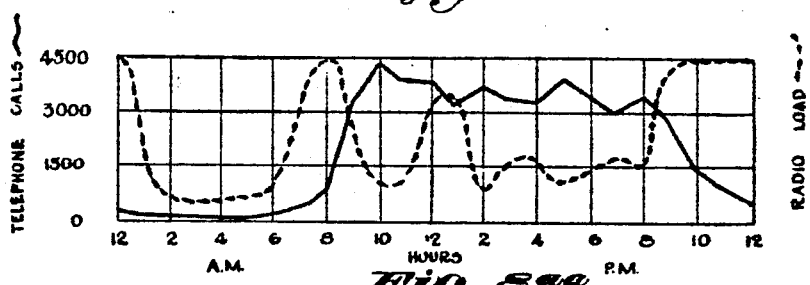
Fig. 8ª
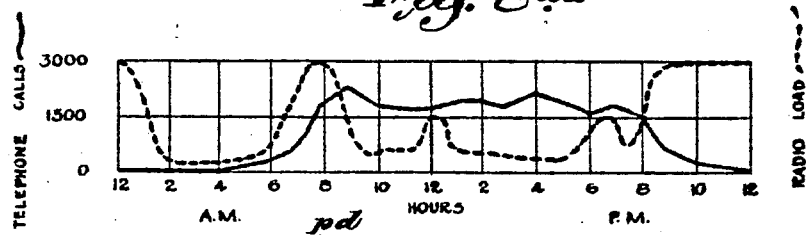
Fig. 8ᵃᵃ
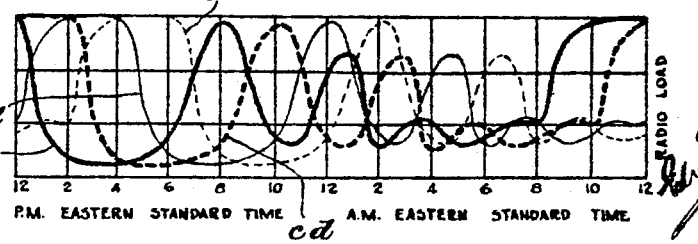
Fig. 8ᵇ

Figure 9:
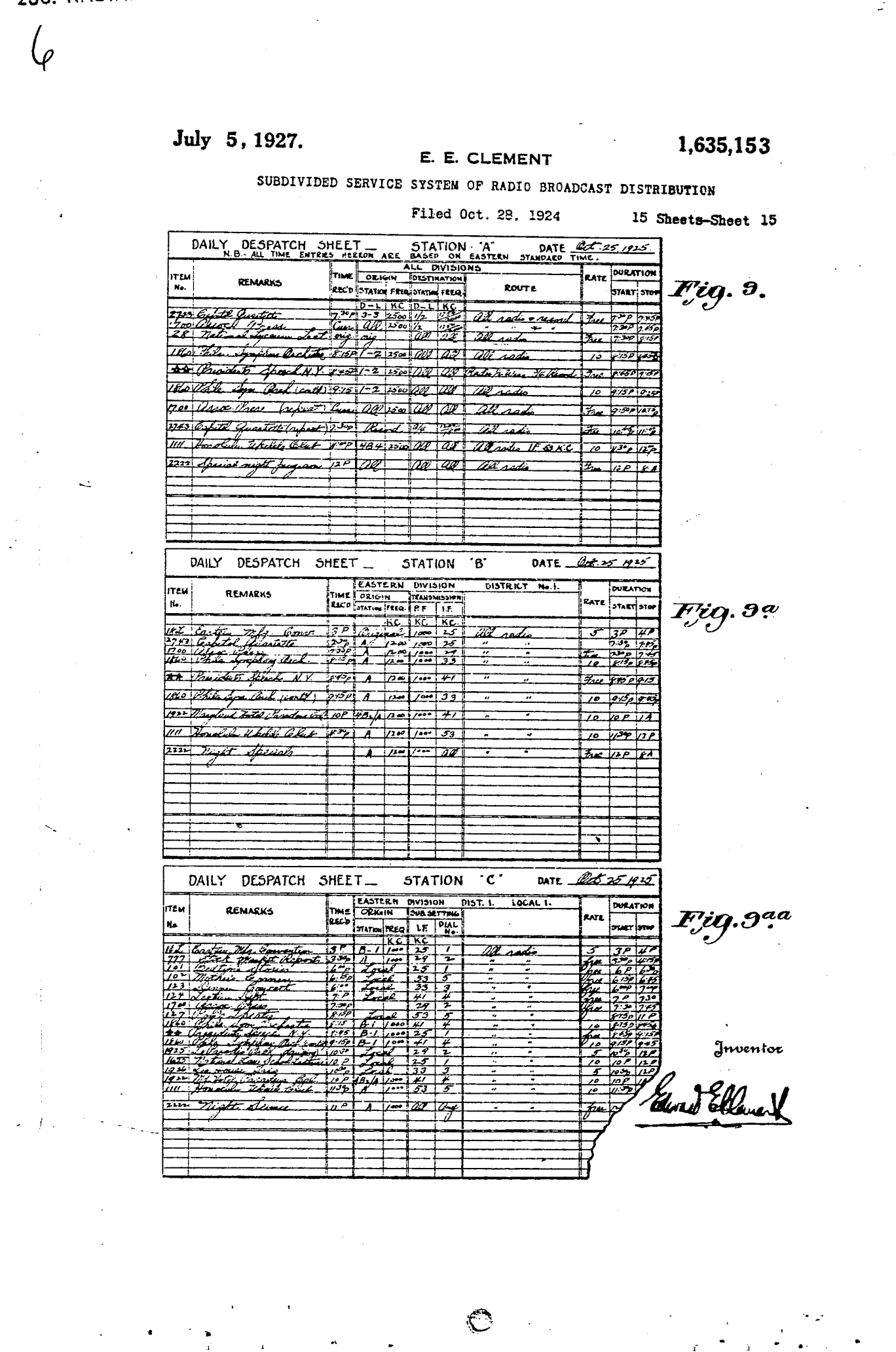

July 5, 1927.

E. E. CLEMENT 1,635,153

SUBDIVIDED SERVICE SYSTEM OF RADIO BROADCAST DISTRIBUTION

Filed Oct. 28, 1924    15 Sheets-Sheet 15

Inventor

Edward E Clement

Patented July 5, 1927.

1,635,153

UNITED STATES PATENT OFFICE.

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA.

SUBDIVIDED SERVICE SYSTEM OF RADIO BROADCAST DISTRIBUTION.

Application filed October 28, 1924. Serial No. 746,357.

My invention relates to systems of radio broadcast distribution, and the present application is a continuation in part of my prior Patent No. 1,522,357. This invention has for its object to provide an organization for the broadcasting of intelligence in which orderly distribution may be secured, with maximum efficiency. An important ancillary object is to gradually bring the entire radio distribution of intelligence under control without disturbance of commercial conditions which have been evolved during the rapid disorganized development of the art. In my patent referred to I have pointed out that the development and control of any general system for the dissemination of intelligence must be in the hands of human organizations which have been prepared by training and experience for such administration, and that these requisites are to be found at present only in the organizations which operate the great wire systems, and particularly the telephone systems. I have also pointed out that on broad economic grounds, any new organization of means of communication to be of public value must be along lines that will not only prevent disturbance of the enormous investment represented by our wire systems, but in view of the increasing ratio of growth thereof both physical and financial, will increase the service of which wire lines are capable and thereby increase their earnings. Such organization of radio administration is possible in the present state of the art, as will be hereinafter explained, and while it may be doubted whether any present specific form would be permanent, it can be so shaped and founded as to be flexible and amenable to changes and improvements in physical agencies available, so that, for example, before any radical general change takes place in methods such as from wire communication to pure radio, the present investment as well as additions thereto during the transition period can all be amortized out of the increased earnings due to the improvements themselves. To attain this, the proposed organization must be based on an underlying principle or principles which will not change but may be regarded as in themselves permanent and independent of the particular physical embodiments employed from time to time. Such a princple is to be found in the mathematical conception of distribution by successive aggregation, which is in part involved in all organizations working from any relative center to numbers of individual units, but in a way the reverse of that which will be herein presented.

Among the commercial conditions which at present must not be disturbed is the widespread individual demand for radio apparatus and parts upon which great manufacturing interests depend, and which has supported in large measure the laboratory work and experiments which are the life of the art. To suddenly organize all broadcasting so that no sending or receiving would be possible except through the organized system, while it would attain the ultimate end of correct radio administration, would at once kill the independent demand for apparatus and cripple the industry. Moreover, the installation of sufficient organized apparatus to carry the radio load, and of the human machinery to handle the gathering, editing and correlating of the masses of information and artistic performance required, cannot be accomplished suddenly, hence the present invention contemplates a gradual diminution of the free broadcasting to which the public has become accustomed and an accompanying regulation of the same so as to greatly improve the quality of service rendered.

In any general system of radio communication, in addition to the purely commercial considerations above stated, certain natural conditions and economic results due thereto must be taken into account. Among these are, first, the progression of time, producing a recurring wave of activities around the world, which in any extended area, such as that of the United States, is very marked; second, diurnal differences in facility of transmission; third, seasonal changes in the same, as between winter and summer; fourth, non-periodic disturbances due to electrical and other natural forces, including so called "static" and "interference" of various kinds, which not only directly affect the apparatus employed, but have a psychological effect on the users.

To attain my objects, and satisfy the conditions existing at present, the system proposed, must work in conjunction with the organized wire systems, in such manner that it can be economically and efficiently handled by or in conjunction with their operating organization; it must be capable of distributing intelligence and programs in any given local area according to local time which includes a progressive distribution through successive areas from east to west; it must avoid the waste of duplicated effort by centralizing control and relating all parts of the system and all agencies therein to a central or master station which at all times can control and supervise the output in all areas; it must be composed physically as to its most numerous units or subscribers' receiving stations of very simple standardized apparatus, requiring no skill in handling to obtain standard service; it must provide uniform expert professional service for all parts of the system to guide, control and assist in receiving as well as transmitting; it must centralize all supply sources of energy in every form; it must supplement and not interfere with the ordinary traffic handling of the wire system; it must adjust its load curve to that of the wire system, so as to aid in producing the ideal flat load curve; it must take advantage of the wire network to render service uniform and stable at all hours and in all seasons, but without interfering with the ordinary wire service; it must provide for emergencies and for special occasions, such as Presidential proclamations or important news of general interest, or special performances, such as grand opera, so that general and simultaneous broadcasting can be accomplished available to all receiving stations, without interfering with either the wire service or local programs of the day; finally it must be available in case of national emergencies of any kind, for separate and secret operation and for complete supervision and control of all stations. There are many other requirements, local as well as general, which with the means to satisfy them are either disclosed in my various prior copending applications, or will appear hereinafter.

The system illustrated and described herein is based on the principle of successive aggregation, and is presented as one form of embodiment that satisfies the various conditions and meets the requirements above set forth. Very briefly stated, this system includes subdivision of the ultimate units or subscribers' stations into local groups in local areas, each group related to a local or regional distributing station; the grouping of these regional stations according to districts and relating each district group of regional stations to a district master station; the grouping of districts into divisions, which may conveniently coincide with the geographical standard time divisions of the country; and finally the relation of the district master stations to a central master station. There may be more intermediate steps or stations interposed between the subscribers' control or regional station and the central master station and there may be direct connection between the said regional stations and the central master station, but these possible variations will be apparent from the detailed description and do not change the principle involved. In any case, for the purposes of distribution, the central master station broadcasts to the district master stations on divisional carrier wave frequencies, each of the district master stations broadcasts to its constituent regional central stations on a fixed carrier wave frequency, and each local or regional central station broadcasts to the subscribers in its local area on a common fixed carrier wave frequency.

Thus it will be apparent that the first characteristic feature of the system is that of sending from each center to the class or order of centers next below it, on a fixed carrier wave frequency or frequencies allotted permanently to said next lower order of stations. If we call the central master station of the entire system, A, and call the district master stations B, the local or regional distributing stations C; and the subscribers' instruments in general D, then we may say that A transmits to B on B frequency, B transmits to C on C frequency, and C transmits to D on D frequency, of the respective carrier waves. For information that goes through from A to D, or that goes through from B to D, as well as information originating with C, original modulations are actually reproduced in the instruments at D, by means which will be described. The simplest way to do this is by double modulation, which also enables easy change of carrier wave frequency at the intermediate or relaying stations.

The second characteristic feature of this system is that all subscribers are connected to their local telephone exchange centers by wire lines, these telephone centers either coinciding with or being closely related to the regional radio broadcasting stations C. For example, in a city having six branch telephone exchanges, one of these might be the radio station C for that area, and the other five connected thereto through telephone trunks, without themselves doing any radio transmitting, or they might all be C stations in the radio system, which would not require so much power. The subdivision herein described takes acount of the inverse square law, and when properly applied, will greatly conserve power, while making receiving from any distance certain.

The combination of the two characteristic features thus outlined produces a very flexible system in which all communication outward from the central or master station through intermediate or B and C stations to the subscribers, is by means of radio carrier waves, supplemented if necessary by modulated high frequency carrier current transmission, particularly at the subscriber's end; and all transmission inward from the outlying or subscriber's part of the system to the C, B or A central stations is by wire, first by audio through the subscribers' lines to the C stations, where it is changed to super audio or IF waves then by trunk lines from the C stations to their respective district master B stations, then either directly by trunk from the district or B stations to the central master or A station, or for economy of trunk lines, from the district master or B stations in any one division through a selected B station and thence by wire trunk to the main central master station A. The number of wired trunks required in any link of the system, and the routing of the wire connections between telephone centers, will be determined in practice by traffic conditions, both telephone and radio. For example, in the case of a city area having six telephone exchanges, all interconnected by talking trunks, there may be one broadcasting station C, preferably located at one of the central stations, and in transmitting on the fixed frequency of its own subscribers, this station should be given access to any of the subscribers' telephone lines in the city. This of course can only be done by trunking to the various exchanges, using substantially the same methods that would be employed by a wire chief, to trunk through and select a subscriber's line. In the same way, in picking up matter to be broadcasted, it would come in over the subscriber's line to the nearest telephone exchange and would then be trunked to the local or regional broadcasting station C if for local broadcasting only, or here to be turned into IF frequency and be trunked on to the district master or B station if to be released for the entire district, or trunked on from there to the national master or A station if to be released for national broadcasting. As an example of the flexibility of the system, it is pointed out that matter can also be transmitted from and released for any desired part or parts of the system. Thus a subscriber or an artist through a local or regional center C can be trunked to the district station B for district release, and thence on to the master station A, and thereby released or relayed to any district station of the system; or from A the release may be by broadcasting to a particular division, thereby reaching all the B stations in that division and being relayed to all other C statons and to all other subscribers.

The reason for dividing the district stations into divisonal groups is because of the change in time. Matters of great national importance may be broadcasted simultaneously over the entire country, even though they would be received at a late afternoon hour in the Pacific coast division, when it was the middle of the evening in the Eastern Standard division. For regular broadcasting of programs, however, matter originating above the B or district stations by this system can be distributed at intervals of one hour in the divisions from eastern, through central and mountain to the Pacific coast. In other words, as standard time in each of these divisions changes one hour in going west, the same program of national interest, would be distributed from A to the four divisions simultaneously, but with an hour's interval between the same items. In the case of news items, and many classes of entertainments this can be done without recording and reproducing, but in the case of other matters it will involve recording the items first broadcasted and repeating the same at an hour interval in the succeeding time divisions.

For purposes of this distribution, the four divisional groups of the exchanges are given four distinctive carrier wave frequencies. Simultaneous broadcasting on all four may be going on at the same time, and it goes without saying that the same items may be distributed on all four by simultaneous modulation on the four carrier waves. The A, B and C broadcasting stations will all be equipped with tunable antenna circuits and receiving devices by which they can pick up modulated carrier waves of any frequency, and by this means the B stations in any division may get original matter being broadcasted in another division, but as a matter of adminstratve efficiency, this should only be by permission. One very strong reason for making the time division is that efficiency of transmission increases behind the daylight line, and any attempt to average times, except on special occasions, must result in a loss of efficiency due to this cause. It is to be understood that the grouping in four divisions however is only adopted for convenience, and may be varied as found convenient in practice.

The design of this system contemplates the use of sufficient power in each transmitting station to accomplish its own function in the system, and no more. For the entire United States it may be assumed that there will be one master station or administrative headquarters; approximately 100 district or B stations, and approximately 10,000 regional or C distributing stations. This is based on statistics of the telephone plant available, and approximately the same distribution of subscribers as in the wired telephone systems. In thickly settled districts, it will be necessary only to consider area in determining the power of the C stations. but in thinly settled districts it may be necessary to consider the number of subscribers, and determine the point at which the rising curve of cost of the broadcasting equipment will cross the curve of profit due to the increased number of subscribers. In such a case, it would probably be more economical to install less powerful central apparatus and more powerful subscribers' receivers, within the above limit, while in the congested district containing many subscribers, it would pay to use more power at the central station and simplify and cheapen the subscribers' instruments.

By means that will be described, it is contemplated to have national district and local programs made up day by day, from which any subscribers may select. Selection is determined by frequencies, which by the use of double modulation may be frequencies of the envelope or intermediate wave transmitted. At present not more than five such frequencies will probably be required for this purpose, although many more are available in the present state of the art, and the number will probably be increased as development proceeds.

Following the plan laid down in my preceding application, Serial No. 581,829, now Patent No. 1,522,357, hereinbefore referred to, all supervision, metering, testing, and the like, which are individual to the subscriber, are done locally, that is to say, over the subscriber's telephone wire and either at his local telephone exchange, or at a local radio exchange associated therewith.

In telephone practice it is found that in usual conditions the traffic load fluctuates everywhere according to about the same rules and to about the same extent. Thus there is a peak between ten and eleven o'clock in the morning, a secondary peak about two o'clock in the afternoon, and other less important peaks in the morning and evening hours. These variations in the telephone traffic load are due to business and social conditions which cannot be altered by service rules and service requirements, but fortunately they occur in such manner and at such times as to favor the drafting of supplemental curves for radio administration which will accomplish results that the telephone companies have long been looking for, including the flattening of the traffic load curve and of the operator hour curve in the exchange operation. The percentage use of the physical telephone plant, even in a congested city, is low, but the equipment cannot be curtailed, on account of the peaks. In as much as the majority of radio users are also engaged in business or social activities, or both, it may safely be assumed that the time they will devote to radio will be that between peaks of the telephone traffic curve. This curve can be regulated, and the hours for transmission chosen so as to fill in the valleys, and if desired make use of the same frequencies or the same switching equipment that in busy hours is devoted to telephone communication. I consider this a very important feature of the invention and shall claim the same both broadly and specifically. It should be noted that the traffic curve in any particular city, will have its peaks occur at points displaced from those in the preceding and succeeding time divisions. Thus the morning peak in Chicago, Illinois, would normally be one hour later than the normal peak in New York city. This means that the radio program may be plotted in the form of a curve for each time division, so that the main peaks of telephone traffic will be avoided, and provision made for adjustment of one to the other sequentially across the entire country, taking account through the district and local stations of any local or special variations and providing for the same through the regular channels of distribution.

It should be observed finally, that in regard to diurnal or seasonal changes in conditions upon which efficiency of radio transmission depends, as well as non-periodic or occasional disturbances, the organized association of radio and wire transmission herein described enables the average standard of transmission to be maintained at all times, since the trunk wires between centers may be substituted at any time by simply tuning down or even heterodyning the initial frequencies and using line radio transmission for the time being in place of pure radio. Furthermore, it is to be understood that the use of all present available means whether described or not is contemplated in this system, as for examples, beam transmission, transmission on very short waves, earth transmission, and the like. It will be noted from the description hereinafter that a geographical center is determined for the master station A, and this will probably have to be the most expensive and most elaborately equipped of all the transmitting centers. However, recent experiments have shown it possible to transmit over very long distances up to approximately 7,000 miles from low power stations, and the relay station of Hastings, Nebraska, has easily reached Argentine. The longest distance involved in this system is approximately 1,200 miles for A transmission and not over 200 miles for B transmission, while the majority of the C stations will cover local areas not exceeding 10 or 15 miles in radius. The national radio conference of 1923, held in the U. S. Department of Commerce, recommended the following ranges for broadcasting:

Government broadcasting stations, 600 miles;

Public broadcasting stations, 250 miles;

Private and toll broadcasting stations, 50 miles. It also recommended that the same wave or overlapping wave bands be not assigned to stations within the following distances from one another; except that these distances may be lowered if the normal ranges of the station are correspondingly lowered:

Government broadcasting stations, 1,500 miles;

Public broadcasting stations, 750 miles;

Private and toll broadcasting stations, 150 miles. According to this classification, there would only be one long distance station in this system, viz. the A or master station; while the district or B stations need have an extreme range of only one-third that allotted for public broadcasting stations; and the C stations would be well below the class limits of private and toll stations. This means that great flexibility can be obtained by the use of a small number of wave lengths for primary carrier waves as well as the intermediate waves produced by heterodyning or double modulation. Assuming four primary carrier wave frequencies to be assigned to the four standard time divisions, respectively, four other carrier wave frequencies may be assigned to each division for transmission from B stations to C stations. and if desired still other four frequencies to the C stations for transmission to subscribers. Inasmuch as the same four frequencies could be used throughout the entire country for district and local broadcasting, this would mean twelve carrier wave frequencies in all. In using double modulation, however, the number of primary carrier wave frequencies for pure radio transmission, may be reduced to four, viz: one common B frequency for receiving from A, one common C frequency for receiving from B and one common D or subscriber's frequency for receiving from C. In this case the initial broadcasting from station A to the four different divisions of the country would be on the same initial carrier wave frequency, modulated however with four different intermediate carrier wave frequencies, one of which is allotted to each of the four standard time divisions. In the same way the B or district stations may transmit to the C stations on the same initial carrier wave frequency, modulated with four intermediate carrier wave frequencies, which may or may not be the same as those transmitted from A. Similarly, the C station will transmit to the subscribers on one initial carrier wave frequency modulated with four or more intermediate carrier wave frequencies which are ultimately demodulated at the subscribers' stations to produce audio message. If the A station transmits to the four divisions on four groups of intermediate frequencies, each division would have its own group of intermediate frequencies and would always receive that, but by having separately tuned local long wave circuits, it could also receive the intermediate frequencies intended for the other divisions, and thereby achieve two ends, viz: first, afford its divisional C stations and their subscribers the opportunity of selection between all the matter that will be broadcasted or has been broadcasted during the preceding or succeeding one, two or three hours, as well as that intended for immediate broadcasting in its own division; and second, repeat programs or items in the programs when desired, so that subscribers who have not had an opportunity of hearing some particular item may pick it up on the first, second or third repetition. For important items this power is a very valuable one, and will probably always be exercised in practice; even though the repetitions of the particular items in the second, third and fourth divisions may be reproductions from records made at the time of the first transmission or broadcasting in the first division. Of course there is a reverse progression to be considered also, in that items forming part of the regular program for the Pacific coast States, if to be heard in the same order in the eastern division or either of the intermediate divisions, would have to be either reproduced on the succeeding day, or produced in advance of their Pacific coast release, recorded and reproduced from the record in the coast division. As a matter of fact, the solution of this problem will probably lie in distributing a national program which will be varied in each division in passing through that B stations, to include matters of importance to that division only, and further modified in passing through the C stations (by authority from above) to include local items of special importance to the local areas.

In using the four frequencies referred to, reference is had to the usual manner of "checker boarding," with one frequency allotted to each square in the checker board, no two adjacent squares having the same frequency. This is not perfect because of the diagonal connection between squares, which would require more than four frequencies to overcome but if the figure be considered as a hexagon, it would be found that the entire area can be divided up separately on four frequencies or four bands without interference. This refers to primary carrier waves only, however, as selection and distribution by means of secondary or intermediate carrier wave modulation is not limited in fact to any particular distribution of the territory, but depends on the distribution among receiving stations of instruments for taking their own intermediate carrier wave frequencies and relaying them to the next lower order stations.

The great benefit of double modulation as will be hereinafter pointed out, is that a wide range of selection can thereby be afforded any local station and any local exchange, which will be the same for all parts of the country and for every exchange down to the smallest hamlet, or the most distant station. In other words, every subscriber in this system may have access to the entire program available to any other subscriber without regard to location, distance, time or circumstances.

Certain lines of apparatus are developed and described in this specification, which so far as possible have been limited strictly to present standards of practice. It is to be understood that these are used for purposes of definition only, and not of limitation. Thus, while the entire system is built up of vacuum tube receiving and transmitting sets, the newly exploited crystal oscillator may be substituted if and when the same becomes sufficiently reliable to meet the public need. All other changes and modifications which do not depart from the spirit of the invention are to be considered as contemplated thereby and included therein.

The inherent function of the organized system hereindescribed for all matter originating at the master station A or distributed from there, is that of overcoming the losses due to the inverse square law, and delivering the modulated radio waves to the ultimate subscribers' receivers with approximately the same amount of energy as if they were situated within short range of the original or master distributing station. This is due to the basic arrangement of the system, viz: the main distributing station A sends to what may be considered a ring of secondary relay stations B, around it. Each of these is provided with means for amplifying and repeating on a different frequency but all of the intermediate rings as B receive on the same frequency and transmit on the same frequency, so that a sheet of amplified waves would cover the territory served by the intermediate relay station. The amount of amplification and the number of relay stations are of course regulated, and the amount of energy thus distributed over the secondary area by relaying can be made as the square of the energy originally distributed from the single master station over the same area. The intermediate stations as B are surrounded by a second set of relay stations (C) which receive the waves from the first set B and again relay them on a different frequency, which is common to all of the second set of relay stations, all of which in addition have amplifying means so that the entire territory served by the said C stations will be covered with a sheet of waves, carrying a total energy content increased over the transmitted waves in proportion to the area. In other words, by this system of relaying by increased numbers and amplification, it is possible to maintain a sheet of waves bearing the same modulations over a very large territory at practically uniform strength for all receivers. The amount of amplification of each station would probably be in proportion to the square of its distance from the preceding station.

In order to insure perfect synchronism and phase identity throughout the transmitting or relay system at each stage, a master frequency can be transmitted from the main station to all intermediate stations, and harmonics of this may be taken and built up to furnish the fresh transmitting waves. See Letters Patent No. 1,403,835, to O. B. Blackwell, which describes the distribution of such a master wave for another purpose.

My invention is illustrated in the accompanying drawings, in which—

Fig. 1 is a geographical diagram of the area of the United States divided with respect to standard time, showing stations positioned to form part of a typical distributing system embodying this invention.

Fig. 1ª is a graphical diagram showing the channels of distribution and lines of authority and control in the system of Fig. 1.

Fig. 1ᵃᵃ is a circuit diagram of the same system shown in Figs. 1 and 1ª.

Fig. 2 is an enlarged geographical diagram of a portion of Fig. 1 showing subdivision of distribution in localized or districted areas.

Fig. 2ª is a graphical diagram similar to Fig. 1ª, showing channels of distribution and lines of authority and control in the district shown in Fig. 2.

Fig. 2ᵃᵃ is a circuit diagram of the same district shown in Figs. 2 and 2ª.

Fig. 3 is a diagram of a telephone central station with two subscribers' stations connected to it and is intended to be read with Fig. 3ª.

Fig. 3ª is a continuation of Fig. 3, and shows a radio central station and a radio subscriber's station physically connected therewith through the telephone circuits of Fig. 3.

Fig. 3ᵇ is a diagram showing the subscriber's double detector receiving set of Fig. 3ª divided into two single demodulating units, one located at the subscriber's station and the other located at the central office, the first detector being at the subscriber's station and sending long waves through the subscriber's line to the second detector at central, which sends back audio waves to the subscriber's telephone.

Fig. 3ᶜ is a diagram showing a further modification of the circuit of Fig. 3b, in which regeneration is added, at the subscriber's station, and the intermediate wave line coupling at central is included in the cord circuit.

Fig. 4 is a general diagram indicating the relation of B, C, and D stations in Figs. 1 and 2 for distributive control of radio broadcast programs.

Fig. 5 is in four parts which are to be read together, as showing four links of transmitting and receiving apparatus from station A, through stations B and C to the subscriber D. These four parts are as follows:

Fig. 5a shows symbolically an arrangement of double modulating and transmitting equipment at the A or master station of the system for matter originating there.

Fig. 5b shows symbolically equipment for the B stations, by means of which the primary carrier waves transmitted from the apparatus of Fig. 5a may be demodulated and the intermediate frequency waves or envelope modulated upon a new carrier wave C.

Fig. 5c shows symbolically apparatus similar to that in Fig. 5b, but intended to be located at the local or regional distributing stations C, receiving, therefore, on the C wave frequency, transmitting on the D or subscriber's frequency.

Fig. 5d shows symbolically a subscriber's set adapted to receive on the D frequency, to demodulate the short carrier wave, and then to demodulate the intermediate frequency carrier wave, so as to produce audio waves as its output.

Fig. 5aa is a circuit diagram of the apparatus in Fig. 5a.

Fig. 5bb is a similar circuit diagram of the apparatus shown in Figs. 5b and 5c, which is the same in construction and arrangement, but differently tuned according to the station B or C. at which it is located.

Fig. 5cc shows symbolically a central office transmitting set which may be located at A, B or C stations, any or all, for simultaneously transmitting the same modulations by means of a short singly modulated carrier wave, and a short double modulated carrier. The single modulation is intended for those outside the system while the double modulation is distributed through the next lower order of stations.

Fig. 6 is a symbolical diagram showing means primarily intended for A and B stations, but which may be located also at C stations, for picking up any single modulated carrier wave which it is desired to put out in the system, and changing this into a double modulated wave by heterodyning, amplifyng, and transmitting the modulated intermediate frequency carrier or beat, on a short carrier wave whose frequency is the mean of the frequencies of the original carrier and the heterodyning oscillator waves.

Fig. 6a is a circuit diagram of the apparatus of Fig. 6.

Fig. 6aa is a circuit diagram similar to Fig. 6a showing a modified form of apparatus that may be used in Fig. 6, employing the autodyne principle for receiving instead of a double tube heterodyne circuit.

Fig. 7 is a symbolical diagram showing equipment supposed to be located at the A, B and C stations, for receiving on any single modulated carrier wave, heterodyning and detecting the same and modulating the beat taken therefrom on to the standard frequency short carrier wave of the next succeeding order of stations. If located at station A, the beat would be modulated and transmitted on the B frequency, and if located at a station B, transmission would then be on standard carrier wave C.

Fig. 7a is a circuit diagram of the apparatus indicated in Fig. 7.

Fig. 7b is a symbolic diagram similar to Fig. 7 showing a modified form and arrangement which may either be substituted for or employed coincidentally with the apparatus of Fig. 7, to receive, demodulate down to audio frequency, amplify remodulate on a different carrier wave, and retransmit, both the received and the transmitted carrier waves in this case being singly modulated, so that any ordinary receiving station may get the same.

Fig. 8 shows superposed simultaneous load curves of the radio and telephone service, respectively, for a period of twenty-four hours, in a large city.

Fig. 8a shows a smaller set of curves for an exchange in a small city.

Fig. 8^aa shows a similar set of curves for a suburban exchange.

Fig. 8^b shows a set of comparative, contemporaneous curves for the four times divisions of the United States.

Figs. 9, 9^a, 9^aa shows the dispatch sheets for the master station, a "B" station, and a "C" station respectively.

Figure 1:
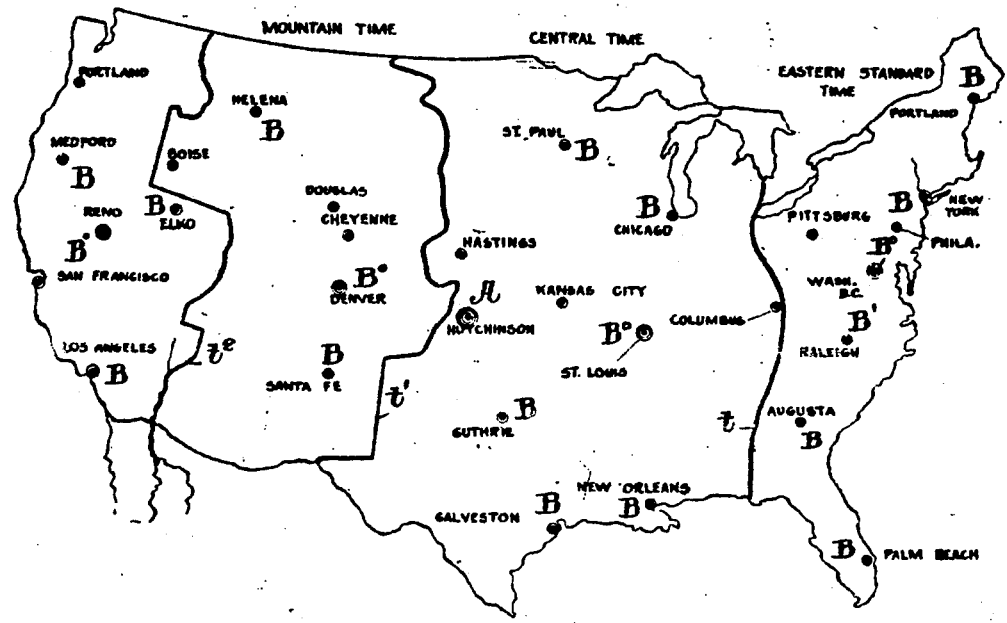

Referring to the drawings, and particularly to Fig. 1, this is a diagram of the United States of America, divided by lines $t$, $t'$, and $t^2$ into four divisions marked respectively "Eastern standard time", "Central time", "Mountain time", and "Pacific coast time". It happens that the town of Hutchinson, Kansas, is within fifty miles of the geographical center of the United States and hence I have shown this town with three rings around it, and the letter A, indicating the location either of the headquarters or master station of the entire system. In each division there is one station with two rings around it and marked B^0. These are the head or master district stations of the several divisions, which under certain conditions serve as relay stations between the A stations and the other B stations for their respective divisions. Other stations are shown in each division with one ring each, and marked B. These are district stations, and receive either directly from the A stations or on occasion by relaying from the head or master B stations in their respective divisions. This illustrates the general manner of distribution, and will be referred to hereinafter.

Figure 2:
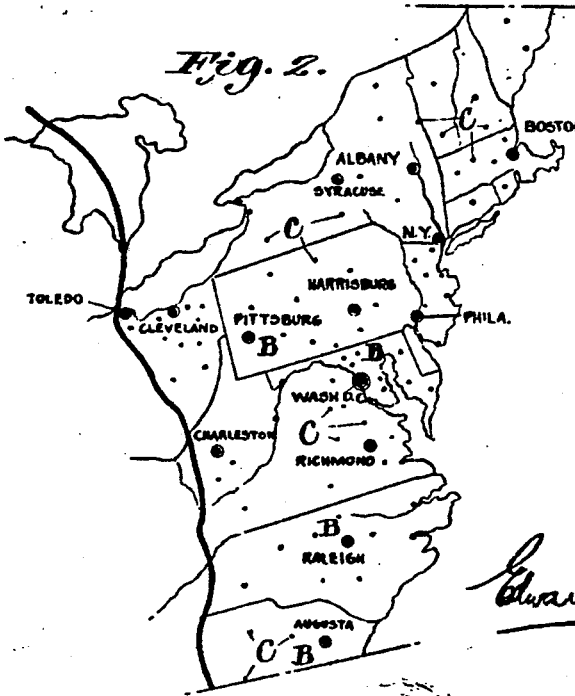

Fig. 2 shows on an enlarged scale a portion of the eastern standard time division, which may be regarded as one or more districts, as it contains a number of district stations B. The main function of this figure is to show the relation between the district station and the local or regional distributing centers C. It is to be noted that Washington, D. C., is the head or master B station in the eastern division, while other towns from Boston to Augusta are shown in Fig. 2 with one ring as ordinary distributing centers each serving a number (which in practice would be very considerable) of outlying local or regional exchange centers marked C. Around each of these local stations or centers C are grouped subscribers. These are not shown on Fig. 2, but are indicated in Figs. 1^a and 4, to which reference will presently be made. The designation of one of the district stations B as a head district station, is more on account of the necessity for regulation of the traffic over telephone trunks than from any necessities existing in the ratio transmission scheme. The use of a long telephone trunk between every district station and the master station A might and probably would be impossible at some times, but the use of a single trunk particularly at night when radio distribution is the most active, would be possible at all times without interfering with telephone traffic. Such a trunk from Washington, D. C., to Hutchinson, Kansas, via St. Louis, or from Reno to Hutchinson via Denver, would be economical, while other district stations could be served by relatively short trunks through Washington, D. C., and Reno, St. Louis and Denver. It should be noted in passing, that I contemplate super-audio frequency modulated carrier current transmission, which has already been successfully employed on long distance trunk lines in ordinary telephone work. The same may be employed on all trunk lines for the telephone component of the complete transmisson circuit. I shall also hereinafter describe as a modification of the main system of transmission the adjustment of telephone trunks and radio apparatus so that the radio transmission and carrier current wire transmission can be used in alternate links back and forth. For example, A can transmit by radio to B, B by wire to C, and C by radio to D, who communicates back with C by wire, which in turn can communicate back to B by radio, and B with A by wire. Either the outgoing or return portion of this circuit may be used to the exclusion of the other portions.

In laying out the scheme developed in Figs. 1 and 2, it is to be understood that no account has been taken of international receiving or transmission. While national or international signals might be picked up at any B station or even at any C station, it would be subversive of discipline to permit the same to be done without express authority and supervision from the master station A. International matters are all usually of national importance, and hence should be distributed in the first instance through the head station A. This means that relay stations East, West, North and South should be established to pick up short waves from abroad and relay the same on to Hutchinson or to other relay stations which would in turn repeat. I have deemed it unnecessary to illustrate or to describe in detail such relaying, because it has already been practiced in the art and as a matter of fact the station at Hastings, Nebraska, among others, was established primarily as a relay station. One advantage of the present organization resides in the fact that long distance relaying will practically be unnecessary because from whatever quarters matters for broadcasting are received, they can be picked up at A, B or C stations, and thence distributed over the entire system through the regular channels. It is not intended that such picking up, or in fact the operation of any portion of the system, shall be haphazard or at the discretion of outsiders. On the contrary, it is designed to make this system uncompromising in its adherence to program, national, divisional, district, and local, and under these heads each day's items will be fixed and determined not only with reference to the needs of the territory for which they are intended but also with respect to time of transmission and the nature of communications to be received from points within or without the system and forming a part thereof, including stations abroad. The importance of the master station A is apparent, since the maintenance of proper coordination demands that no departure from the regular routine be permitted without permission and provision therefor from the master station or headquarters A.

In Fig. 1 I have shown eight district stations B in the eastern division, ten in the central division, and six each in the mountain and Pacific coast divisions, or a total of thirty. This of course is illustrative only and not to be taken as final either in positioning or numerical selection. As a matter of fact if the area of the United States be divided up into substantially equal districts, approximately one hundred district stations B would be a convenient number, but it is doubtful whether the traffic would require this many district stations at first. In Fig. 2 I have shown a larger number of stations in part of the same territory, or B stations, and have related a considerable number of C stations thereto. The location of these is a matter of choice, and they may or may not be associated with local telephone exchanges, as convenience and traffic conditions may demand.

As will presently appear, the programs in each division will vary, both in substance and in time of release, hence it is necessary to have some positive method of differentiating between the broadcast carrier wave intended for each division and those intended for the others. While this may be accomplished in several ways, I prefer at present to use carrier waves of distinctive frequencies, one for each division. In the present state of the art, these may advantageously be very short waves, of the order of 3,000 kilocycles per second. The frequencies allotted to the B stations of the four divisions should be fixed and determinate, and known as division frequencies. Transmitting on these frequencies will ordinarily be from the A station, but under direction of the A station any B station may send on the B frequencies for special items or for relaying. If each division is thus given a distinctive frequency, four frequencies in all will have been allotted. In transmitting from the B stations in their respective districts either for relaying matter received from A, or for original matter, non-interference can be secured in a number of ways. The simplest of these is to allot different carrier wave frequencies to adjacent districts, so that no two adjacent B districts may have the same frequency. To secure non-interference between adjacent local exchange areas C, these also can be allotted different wave lengths for adjacent local areas. By this means, the system can be rendered flexible so that each district and each local C exchange can insert local matter in the broadcasting, without danger of overlapping. Assuming that this will require four frequencies for the B stations, four for the C stations and four for the D stations, a total of twelve frequencies would be required, which is well within the total number available, especially if very short waves are used for the primary transmission from A to B stations. It is to be understood that in merely distributing by relaying from A to B, from B to C, and from C to subscribers D, there could be no interference, as the same modulations originating at A would be repeated over the entire system. Also, it is to be understood that where different divisions or different districts or different local C stations are allotted different times on the program there can be no interference, even though the same carrier wave length be used for all of each order of stations.

Another method is to use double modulation with a plurality of intermediate frequencies modulated on the same carrier wave, so that selection of the modulated intermediate frequencies may be made, and so that at given times some or all of these intermediate frequencies may be employed for matter originating at B or C stations. For example, assume station A to broadcast to all stations B in all the divisions on the same short carrier wave. Assume that matters intended particularly for the eastern division are modulated on an intermediate wave of one frequency, those for the central division on an intermediate wave of a second frequency, those for the mountain division on a third intermediate frequency, and those for the Pacific coast division on a fourth intermediate frequency. The B stations would all be tuned as to their antenna circuits to the same carrier wave frequency, but their local circuits would be tuned selectively to the four different intermediate frequencies according to their location. Any B station in the central division would then take off the "Central" modulated intermediate frequency only, amplify and remodulate the same upon the C frequency for its district, and so on.

Reference will be made again to these methods of distribution after the apparatus and circuits shown in the drawings have been described in detail.

For the purposes of a basic description herein of the system as a whole, in the simplest form, I shall assume that each of the three orders of stations, B, C, and D, is allotted a single carrier wave frequency for receiving, which is common to all the stations of the same order, and that say ten intermediate or long wave frequencies may be modulated thereon, each intermediate frequency being in turn modulated at audio frequencies intended for distribution. At certain times these ten intermediate frequencies may all be used at the master station A and broadcasted on the B carrier wave to all the B stations, which in turn will demodulate the initial carrier, amplify and reimpose the same intermediate frequencies and modulations on the common C carrier wave and so relay them to all the C stations, which in turn will demodulate the carrier waves received by them and reimpose the same upon the common carrier wave allotted to all the D or subscribers' stations. At other times there may be only one or two or even none of the intermediate frequencies in use by station A and at such times the unused intermediate frequencies may be allotted to different B stations or even to C stations for local or district broadcasting. In the first instance, it will be observed that the original modulations on all the intermediate frequencies are simply passed along by relaying until they reach the subscribers, who receive them in the original package, so to speak, so that it is entirely possible to say truthfully to the subscribers that they receive and actually hear the original audio modulations, with equal efficiency from all points, foreign or domestic; and this in spite of the simplicity of their instruments.

Referring to Figure 1ª, the station A is shown connected by lines of distribution to district stations B', B², B³, and B⁴. The stations B' are in the eastern division, the stations B² in the central division, the stations B³ in the mountain division, and the stations B⁴ in the coast division. Each of these district stations is shown connected by lines of distribution to local distributing stations C in its district, and each of these local stations is shown connected to stations D typifying the ultimate subscribers' stations. The lines of distribution also represent telephone trunk lines from C stations to B stations C represent the subscribers' telephone lines which either terminate in stations C if they are identical with telephone exchange stations, or are connected thereto, as indicated in Figures 3 and 3ª.

It will be noted that in Fig. 1ª not all the stations B are connected to station A by direct individual trunk lines, but some district stations trunk through a district master station, thus economizing trunk lines. Thus, the trunks 58, 59, and 60 in Fig. 1ª are shown extending to master district stations in the groups B², B³, and B⁴ respectively, other B stations in these district groups being connected to A through the respective master stations B by relatively short trunk lines 61, 62 and 63. The number and routing of trunks so used is of course variable, and may be accommodated to the necessities of telephone traffic so as not to interfere with the normal telephonic use of the wire plant, which is one of the cardinal points in the design of the present system. Details of district and local connections will be reserved for description in connection with Figs. 2, 2ª and 2ªª.

A better idea of the general arrangement of circuits symbolized in Fig. 1ª is conveyed by Figure 1ªª, wherein a subscriber's line 18—19 (see Fig. 3) extends from his station D to the central telephone exchange C which is equipped with line jacks J', connecting plugs P—P' and trunk jacks J⁵. From the trunk jack J⁵, shown in the figure, a trunk line 50 extends to the district station B, which is also equipped with switchboard terminals including plugs P⁵—P⁶ and trunk jacks J⁶, J⁷. From the jack J⁷ shown in the figure a trunk 51 extends to the master station A where it terminates on a jack J⁸. The station is equipped with plugs P⁷—P⁸, and may be fully provided with telephone switching equipment, like the stations B and C. Details of such switching equipment are shown in Figs. 3 and 3ª, the parts being lettered the same in all figures. In Fig. 1ªª operators' telephone instruments are shown at O, connected in the usual manner to the cord circuit, and these symbolize a complete signaling and supervisory system. Each operator at stations B and A also has a demodulator and receiver for long IF waves, with suitable key for controlling the connection of the same to her cord circuits.

The radio equipment of station C includes a relay receiver and transmitter T with a local microphone and amplifier t² for local modulation. The antenna symbolized at 52 is supposed to receive waves sent out from the B station of the district in which the particular station C happens to be located, and to which it is connected by means of the trunk line 50, which of course does not symbolize all telephone trunks but only such as may be allotted for the so-called radio traffic. The frequency to which the antenna circuit 52 is tuned is that allotted to the C stations and to which they are all normally or permanently tuned. The antenna circuit 53 is for radiating modulated carrier waves to the subscribers D in the particular local area surrounding and served by the station C under consideration. The frequency to which the antenna 53 is tuned is that allotted to the subscribers D, and to which they are all normally or permanently tuned. The details of the subscriber's station apparatus, including both telephone and radiophone are shown in Figs. 3 and 3ª, wherein a particular station of class D is designated as A', and will be described hereinafter.

Obviously, performances, or news, or other items of varied character which it is desired to broadcast either locally or over this entire system may be picked up in any part of the same, and since it would be impossible to bring all artists, to, or to originate all matter at, the station A, there must be provision for ingathering as well as for distribution, or, stated in another way, the system must be flexible enough to permit broadcasting from any part of it. It may be assumed therefor, without attempting to arbitrarily settle details of ultimate practice, that all studio and other connections for broadcasting, should initially be made through a C station. Theoretically any subscriber's station having a telephone transmitter may thus become a broadcasting station, as disclosed in Patent No. 1,522,357, hereinbefore referred to. Practically, while the subscribers' stations may be used as pickups, regular studio work will probably always be done either through PBX boards with special equipment, or in other special stations connected with a C central station. All of these may be taken as symbolized by the station D or A' in Fig. 1ªª. It should be noted in passing that this allocation or original modulation to C stations does not interfere with direct broadcasting from A or B stations, since each of these can most conveniently be located at and operated in conjunction with a telephone central exchange which is also a C station or has a C station connected to it, as shown in Figs. 3 and 3ª. Thus in Fig. 1ª I have shown a microphone transmitter 64 at every station of the orders A, B, and C, to indicate that broadcasting may be originated thereat when required. The actual manner in which this is now intended to be done is shown in Fig. 1ªª. The symbolic station C is provided with a pair of jacks J¹³ and J¹⁴ between which are connected the audio amplifier 65 and the intermediate frequency modulator and oscillator transmitter 66. The jacks J¹³ and J¹⁴ may be connected through the operators' cords and plugs with the line jack J' on the one hand and with either one of the jacks J⁴ or J⁵ on the other. If jacks J⁸ and J¹³ are plugged together and jacks J⁴ and J¹⁴ are plugged together, then the operation would be as follows: Assuming the subscriber A' to transmit sound waves electrically over his line 18—19, these waves pass into the audio amplifier 65 and thence into the modulator 66, whereby a modulated intermediate frequency carrier wave is communicated to the input side of the relay transmitter T, which in turn modulates the long wave thus produced upon the short carrier wave allotted to stations D, and radiates the same from the antenna 53. Thus the station C is broadcasting on the common frequency wave, using an intermediate frequency which the subscribers can receive by double demodulation, in a manner to be presently described.

Now assume that instead of jacks J⁴ and J¹⁴ being plugged up together, the jacks J⁵ and J¹⁴ are so connected. The result will be as follows: The audio waves over line 18—19 pass to the audio amplifier 65 and thence to the modulator and oscillator transmitter 66, by means of which an audio modulated intermediate frequency carrier current is transmitted over the trunk line 50 to the station B. At this station an arrangement of jacks is encountered similar to that at station C. Jacks J¹⁵ and J¹⁶ have connected between them an intermediate frequency or carrier amplifier 67 which may be plugged up either for broadcasting from the antenna 55, or for continued transmission over the trunk 51 to the station A. To produce the first result, jacks J⁸ and J¹⁵ are plugged together and jacks J⁹ and J¹⁶ are plugged together, whereupon the carrier current or intermediate frequency carrier waves will be communicated to the input circuit of the oscillator transmitter B and thereby modulated on a high frequency carrier wave radiated from the antenna 55, at standard C frequency. This wave will be received and may be relayed by all the C stations within range of the transmitting station B. If wider distribution be desired the jack J¹⁶ is plugged onto the jack J⁷ of the trunk line 51, and the amplified or relayed intermediate frequency carrier waves are transmitted to the station A. Here the arrangement of the intermediate amplifier 68 between the jacks J¹¹ and J¹² is the same as that of the amplifier 67 at station B. By plugging up the jack J¹² to the jack J¹⁰, the amplified intermediate frequency waves will be communicated to the input side of the oscillator transmitter T² and thereby modulated on a short carrier wave and radiated from the antenna 57. As this wave has a frequency allotted to the B stations, all the B stations will receive it, and may in turn relay it to the C stations and they in turn relay it to their subscribers. One reason for the rule that all broadcast matters shall originate at or through a C station will now be apparent, viz. that the initial audio or telephone waves may be changed as near as possible to the point of origin to modulated intermediate frequency carrier waves, which may then be imposed as modulations on a radiated carrier, or on a wire circuit, with equal efficiency. Audio waves in a wire circuit are subject to attenuation and distortion to a greater degree than modulated superaudio frequency carrier waves. Also, by using superaudio frequency currents on the trunk lines, advantage can be taken of the well established systems of multiplexing and relaying already in use, and the trunks rendered more productive without interfering with their telephonic use. Thus, the initial audio waves are always changed into modulated superaudio waves at the nearest central station, and thence dispatched either on a carrier wave radiated from an antenna, or on a trunk wire to some other point where they are so dispatched. In order to add still further to the flexibility of the system, the A station at the right of Figure 1$^{aa}$ may trunk as from a jack or jacks J$^{12}$ through a trunk or trunks designated as X to any other part of the system, as for example to a particular B station, where the trunk X may terminate on a jack similar to J$^6$, for connection to radio transmitter T', or by further trunking to some particular C station, and so to the radio transmitter T at such station, whereby matter can be picked up at any point and broadcast either generally or in a selected district or in a selected local area only. It follows also from this arrangement that when radio transmission is difficult over long distances or in any particular section of the system, due to seasonal or diurnal or non-periodic phenomena, the distribution by wire can be made to supplement distribution by pure radio and the average of efficiency maintained throughout the system. To accomplish this every part of the system must cooperate perfectly with all other parts as determined by the master control station A and district master control stations B, B', etc., both in time of transmission and maintenance of clear transmission channels. Such coordination may be compared to the system of train-dispatching on a railway system, and involves the use of interlocking records and time sheets, for A, B and C stations, and the management and dispatching of all radio traffic by a regular traffic force trained for that purpose. To fully understand this idea, the operating organization must be considered for a moment. First it must be taken into account that this system does not contemplate uncompensated or irregular use of telephone trunks and wire plant, but on the contrary is based on the assumption that the telephone companies, by contract or otherwise, will have a participating interest in all earnings of the radio broadcasting system, if they do not collectively act to operate it. The use of all wires and switching equipment will therefore be paid for, and the cost of the service with a suitable profit will be distributed over the entire body of subscribers, and regularly collected by the local central station authorities by flat rentals or toll charges, both of which are herein provided for. Owing to the character of much of the work involved in operating, such as gathering, collecting, editing and allocating, the material to be broadcast as well as the attendant work of despatching and supervising the distribution of the daily program over the country, all of which is foreign to the normal service activities of a telephone organization, it would appear necessary to have a special operating organization, embracing the following: (1) Reporting and editorial department; (2) contract department, for artists and contributors; (3) engineering department, for regulation of methods and standardizing of apparatus, to work in conjunction with telephone engineering staff; (4) operating department, including routing, despatching and supervision; (5) business department, to receive and handle all matters of accounting, and in cooperation with the telephone organization, to fix charges. The organization thus outlined might be grafted on the parent organization of such a telephone company as the American Telephone and Telegraph Company, but two conditions peculiar to the telephone field in the United States would render a separate radio broadcasting corporation of the United States more desirable, viz, first that telephone companies are common carriers, and are subject to strict regulation as such by both Federal and State Public Utilities Commissions, whereas the radio broadcasting business is not a public utility but falls naturally into the class of newspaper and magazine press organizations; and second that there are several thousand independently owned telephone exchange systems in the United States, which while in contract relations with the main telephone company, for long distance trunking service especially, are not controlled or operated thereby. For the reasons thus stated, it is necessary to provide a certain flexibility in both apparatus and methods herein disclosed, although by preference the standard apparatus and operating methods of the Western Electric Company, and its owner, the American Telephone and Telegraph Company, are herein illustrated and described. Thus in Figs. 6, 6$^a$, 6$^{aa}$, 7, 7$^a$ and 7$^b$, I have presented apparatus, presently to be described, which can be used either to supplement or to replace the general system apparatus of Figs. 5$^a$ to 5$^d$ inclusive. The latter however is standard, and the best answer to the operating problem is to permit independent broadcasting only to a degree sufficient to temporarily care for independent receivers.

Again referring to Fig. 1$^{aa}$, it will be observed that station C as well as stations A and B are indicated as having originating modulators (shown as microphones) 64, which may be plugged onto either the input side of the respective radio broadcast transmitters T, T′, and T², or the respective trunks 50, 51, and $x$. At station C the modulating audio transmitter can be operatively connected to either jack $J^4$ or $J^5$ by inserting plug $P^9$ in the jack $J^{13}$ of the amplifier 65 and long wave modulator and oscillator 66, and then plugging jack $J^{14}$ to either of the other jacks at will. The parts 65 and 66 are here made separate units because they are common to all subscribers' lines as well as the operator's microphone circuit. At station B the operator's microphone is connected to plug $P^{10}$ through amplifier 69 and long wave modulator and oscillator transmitter 70; and at station A the operator's microphone 64 is connected to plug $P^{11}$ through amplifier 71 and modulator and oscillator transmitter 72. At station B the trunks 50 bring in modulated intermediate frequency (IF) waves or carrier current, and in passing this to either transmitter T′ or trunk wire 51, only amplification is needed, which is supplied by unit 67, which may be a vacuum tube relay as well as amplifier unit. Similarly at station A the trunks 51 from B stations bring in carrier current or (IF) waves, and the relay and amplifier unit 68 is provided accordingly. Finally, to enable full supervision as well as reception of audio at each station A, B, and C, the operators' circuits are indicated as provided with demodulators 72, 74, and 76, and receiving telephones 73, 75, and 77 respectively. These are supposed to be connected to the cords through listening keys 78, 79, and 80, respectively, which may also control the connection of ordinary operators' telephones 81, 82, and 83, respectively, for telephone conversation over cords, trunks and lines as usual.

Referring now to Figs. 2, 2ª, and 2ªª, I have shown therein the method of distribution in the district or B areas. In Fig. 2 this is indicated geographically, as to the relation in general between B and C stations; and in Fig. 2ª, the lines of authority and distribution are shown, somewhat more in detail than in Fig. 1ª, but employing the same principle. In Fig. 2ª, the B station has receiving and sending antenna 54 and 55 and is connected by wire trunks 50 and 50ª to local distributing or exchange stations C. The station C on the left side of the figure has connected to it by wire trunks two other C or central stations, both being branch exchanges depending upon trunking connection with the main station C for their cooperative functioning in the system. One of these, marked C′ is a local branch exchange in the same city or local area as the exchange C, and has no antenna, since its subscribers D can receive directly from the broadcasting station at the main exchange C; but as the functions of battery supply, metering, supervision, trunking and ingathering of material are all performed at the terminal points of the local subscribers' lines, the equipment for these purposes is the same at the branch exchange C′ as at the exchange station C in Fig. 1ªª, omitting only the radio transmitter T. Thus, in a city or other local area served by a plurality of telephone exchanges, there need be but one radio broadcasting or C station, which reaches the branch exchanges and subscribers telephonically over wired trunks and vice versa.

The station C² in Fig. 2ª is supposed to be a PBX or private branch exchange. Here the exchange has the antenna, receives the radio broadcast waves from C, and after demodulating the short carrier wave, sends the modulated IF waves to the subscribers over their wire lines. In this case the subscribers' instruments need not be double demodulators, but may be single detector instruments of ordinary type. The wire communication between the subscribers and the PBX, C² and between the C² and the station C, is the same as before for all purposes. As there are very many branch exchanges and PBX exchanges in the telephone systems, especially in large cities, these modified arrangements are of importance.

On the right hand side of Fig. 2ª are shown another branch exchange C′, and a party line C³ leading out of exchange C. This party line has three subscribers connected to it, and by means presently to be described more in detail, they can be supplied collectively or selectively with the broadcast waves. Station C has a radiating transmitter, and the stations D on line C³ have receiving antennas, but they may also be fed over the line itself. To differentiate between the subscribers' stations different intermediate frequencies or different carrier waves may be employed at C stations as will be presently described.

Referring to Fig. 2ªª, the arrangement of trunks is shown to be substantially the same as in Fig. 1ªª, the difference being in the method of subdivision. The detail of amplifiers, modulators and long wave or IF oscillator transmitters at stations C is the same as in Fig. 1ªª, and the parts are numbered the same. Recalling that C′ represents a branch exchange, and that C² is a PBX, the following special points will be noted: At C′ there is no antenna, and no radio receiving or transmitting apparatus. Preferably the station C′ trunks subscribers over ordinary telephone circuits for audio frequency transmission to C, where they may be placed on the amplifier and transmitter units 65 and 66 if desired to broadcast. As a matter of practice, since there are usually a number of branch public exchanges in any large city or county area, within local range of one radio broadcasting station such as C, the radio switchboards, with all wire chiefs, chief radio operators and other radio apparatus and functioning, should be located at main station C. However, line and instrument tests and especially metering of service will always be done at the local branch exchange, as C'.

At C², the PBX shown has radio receiving apparatus C²⁰, but no radio transmitter of long wave generator. The received waves are relayed at IF to the subscribers over their wire lines and at each subscriber's station there is a single detector set coupled to the line by a tuned radio coupling, by means of which the subscriber can receive the original modulations. It will be noted that in every case, and under all the various conditions herein described the messages or signals delivered to the subscriber are the very identical original modulations carrier on an unchanging constant frequency envelope or IF carrier itself modulated on a short wave carrier the frequency of which is indeterminate and may be, and is, changed in relaying without affecting the IF wave or modulations thereon. Thus, the goods may be said to be delivered to the subscriber "in the original package", regardless of the point of origin.

It will be understood that Figs. 1ᵃ and 1ᵃᵃ are merely outlines or skeleton diagrams, in which the metallic line and trunk circuits with all their minutiae of line and cut off relays, etc. are presented by single lines, and the subscribers' and central office apparatus is all indicated by elementary symbols; but are intended to represent fully developed and equipped standard lines and stations, as shown for example in Figs. 3 and 3ᵃ. It may also be noted here that for simplicity of description and illustration I have purposely shown manual rather than automatic telephone switching apparatus at the exchange centers, but for the attainment of every purpose and the performance of every function in my system which is herein shown attained or performed by manual apparatus, I contemplate as well the use of the corresponding automatic apparatus, as will be further explained hereinafter.

Referring to Figs. 3 and 3ᵃ, I have therein shown circuits of the central office and substation equipments and connections, Fig. 3 representing the telephone side of the system, and Fig. 3ᵃ the radiophone side of the system. Before proceeding to detail description it may be noted that in accordance with standard telephone practice, provision is made for keeping the telephone lines and central office circuits clear of all grounds or other disturbing connections during conversation. When the radiophone goes into service, by closing the filament switch its operation in receiving is identical with that of any radio receiver, and in the event that use is made of any transmission of waves over the line wires, as will be hereinafter pointed out, said transmission will be at a frequency above the limits of audition. In the present diagram, I have shown the circuits arranged with nothing but continuous current for radio purposes over the telephone line wires. This is the simplest form of control and the one nearest to present-day telephone practice, and is absolutely certain not to produce any disturbance in adjacent conductors in the telephone cables. Each radiophone set is provided with a cut off relay energized when the telephone set goes into commission, either by calling or being called, and at the central office whenever the radio operator takes control of the line, he disables it in the usual manner by pulling up the cut off relay at the telephone switchboard, this however being subject to the condition that a special tone test may be put on, so that all operators may know that the line is held on the radio board, and subject to interruption for telephone connection. I prefer to use this tone test only with the radio operator's testing plug, because his regular connecting plug includes within its functions that of connecting a subscriber through the station amplifier to the broadcasting transmitting set, and a connection of this character should not be interrupted without permission.

Referring now to the diagrams, Fig. 3, A and A' are two subscribers' stations connected by line wires 16—17 and 18—19 respectively to the central station C where they terminate on jacks J and J'. P—P' are plugs forming the terminals of a cord circuit 20—21, 22—23, having a bridged repeating coil I, ringing and listening keys K and K', supervisory signals $s$—$s'$ and bridging connection to the main battery B. The same battery is shown supplying current to the line relays L, L', and through contacts at the cut off relays L², L³ to the respective lines for calling purposes. In this system, when a subscriber takes down his receiver, the line relay lights its lamp, which is extinguished when the operator inserts the answering plug. Battery supply for the connected lines is thereafter taken through the cord circuit 20—22, 21—23, in a manner well understood in the art. When the substation telephones are out of service, with their receivers hanging on their hooks, the line circuits are conductively open for direct current, leaving the ringers Q and Q' in circuit for alternating ringing current passings through the condensers $q$—$q'$.

Referring now to Fig. 3ᵃ, it will be observed that the radio switchboard which I have designated generally by the letter R, is connected to the subscribers' lines by multiple taps marked $16^a$, $17^a$, and $17^b$, and $18^a$, $19^a$, $19^b$. These terminate on multiple jacks $J^2$, $J^3$, corresponding to the multiple jacks on the telephone switchboard. It should be noted that throughout this system the tip wires 16 and 18 with their branches are connected to ground, while the sleeve wires 17 and 19 and their branches, are connected to battery. This is extended into the radio side of the system for the purpose of securing proper balance between the main battery or power plant of that side and the main battery or power plant of the telephone side of the system.

At the subscribers' stations taps are also taken off from the telephone terminals to the radiophone terminals as indicated at $18^c$, $19^c$, and $19^d$. (The radiophone is shown only at one substation for sake of simplicity of illustration). The two branches $19^c$ and $19^d$ are taken from the sleeve or battery side of the line 19, and are connected to opposite terminals of the winding of a relay $L^4$, which constitutes the substation cut off relay for the radiophone. The winding of this relay is bridged by a condenser $q^2$ through which both ringing and voice currents can pass without substantial impedance. Where the radiophone is attached to a party line substation, this relay $L^4$ may be omitted, since on such party lines there are usually grounds on one side or the other. As will presently appear, the radio circuits described herein are applicable to two-party and four-party lines, with individual metering of the party stations.

Normally, that is to say, when the telephone circuit is not in use, the cut-off relay $L^4$ is deenergized and as a consequence the wire $19^c$ is connected through a back contact of the relay through extension wire 24 to the branch 25 connected to the "A" battery marked $A_1$ in Fig. $3^a$. The wire $18^c$ similarly passes through a back contact of the relay to the extension wire 26 leading to the test or listening relay 27 and ground. $18^c$, it will be remembered leads to the tip or ground side of the line, therefore it is the side which in the radiophone can be made use of with a permanent ground or grounds, without disturbing the balance of the telephone circuit.

The radiophone receiver at the substation A' is shown as comprising an antenna 28, tuned coupler 29, first detector tube 30, tuned filter coupler 33, second detector 31, audio amplifier tube 32, and audio transformers 34, 35, the last mentioned transmitting the amplified audio waves to the telephone receiver or loud speaker 36. The filament battery is $A_1$. The plate battery is $B_1$ and suitable tuning condensers and coils, tickler coil for regenerative effects, etc., are provided as required. I should remark in passing that this representation of the radio receiver is intended to be typical only.

The relay $L^5$ has four pairs of contacts, one pair $27^a$ closing the wires 25 and 37 from battery $A_1$ to the filaments. The second pair $27^b$ closes the wires 25 and 38 so as to put battery $A_1$ on the telephone transmitter T', and through the induction coil I', to ground. The third and fourth pairs of contacts $27^c$, $27^d$, close the wires 39 and 40, forming terminals of the secondary induction coil circuit I', to the tip and sleeve side of the telephone line respectively, through the back contacts of relay $L^4$. The transmitter T' is shown hanging upon a hook switch H' controlling the connection of wires 41 and 42, constituting a parallel link between the battery $A_1$ and the filament bus 43. Thus the filament can be heated and the radiophone put in service either through the agency of the relay $L^5$, or by the switch hook H'. The former is controlled by the radio operator at central, and the latter by the subscriber at the substation. In addition to the hook the subscriber has a manual switch $h$ by which he can connect the battery wire 42 through a wire 44 to his transmitter T', coil and ground, so as to energize his talking circuit. I provide an ordinary telephone receiver $t'$ in series with the secondary of the induction coil I', and I interpose a pair of condensers $q^3$, $q^4$ between the secondary of the induction coil I', and the receiver $t'$ on the one hand, and the terminals of relay $L^5$ on the other, so that while the subscriber by means of switch $h$ can connect his phone T'—$t'$ for receiving calls over the telephone line, he cannot originate telephone calls thereover from the radiophone extension. This is subject to modification by omitting the condensers if desired to originate calls.

Returning now to the central station, and particularly to the radio department thereof shown in Fig. $3^a$, T represents a broadcasting transmitter, symbolized in very simple form, but supposed to contain the usual elements of power supply, modulator, oscillator and aerial, with suitable amplification of the audio waves supplied on the input side. The jack $J^4$ connected to the amplifier $t^2$ and thence to the transmitter T, symbolizes a group of such jacks or equivalent connecting means such as automatic switches, controlled by dials or keys for connecting any of the wire lines to said radio transmitter. Detailed appliances, both for the switching and for the radio transmission, are well known in the art, and need no specific description, my present invention having to do particularly with the method of transmitting by wave radiation to the substations, and of bringing in all conversation originating or received at the substation radiophone over the subscriber's wire line. This includes repetition of modulated radio waves received at the radiophone substation and also originating messages gathered up and to be put through the amplifier $t^2$ on the transmitter T for broadcasting.

It may be explained here that the transmitter T for general purposes is assumed to be the standard carrier wave length transmitter for the local exchange area, to which all of the substations are tuned and upon which they depend both for original messages and programs and for those received and relayed from a distance. There are special cases, however, in which certain groups of radiophone subscribers may desire intercommunication among themselves, and I contemplate therefore the installation of duplicate modulators and amplifiers, or complete duplicates of this transmitter, which may be connected up for group use. For example, a chess club desiring to meet, arranges a program, and at the appointed time its members attend at their radiophones, all removing their transmitters T' from their hooks, while the radio operator at the central station plugs up the multiples of their respective lines through their jacks $J^2$—$J^3$, and connects them on to a broadcasting transmitter of the type T. This plugging up may be carried out in any desired manner, there being several ways well known in the art for thus connecting telephones lines together. The radio operator then supervises the operation, since any one of the connected subscribers may be speaking through the broadcasting transmitter to the others, and it is necessary to prevent interruption. The same might be said of any meeting of a group of people held in this manner, the most valuable feature of this part of the invention being the absolute control afforded over the transmitted messages. The connection to the broadcasting transmitter is solely within the control of the radio operator at the jack $J^4$ or any other suitable form of switch, and he has it in his power therefore to cut off connection at any time. This will be referred to again hereinafter.

The cord circuit between plugs $P^2$ and $P^3$ in Fig. $3^a$ is the same as the operator's cord circuit in Fig. 2, but the radio operator also has special test cords such as that shown in the upper part of the figure connected to plug $P^4$. Here the keys K—K' are of standard construction, as in the other cords, and the test contact of the plug $P^4$ is connected through suitable resistance to the supervisory lamp $s^2$ to the radio battery B', means such as the commutator $p^5$ being provided to give special tone test on the test thimbles of the multiple jacks J, J', $J^2$, etc. It will be observed that the constant connection of the sleeve or battery wire 24 at the radiophone substation to the bus wire 25 of the battery $A_1$, produces charging of that battery by the constant flow of current therethrough from the main radio battery B' at the central office. The amount of energy thus delivered to the battery $A_1$ depends upon the size of the line wires, and the length of time available for such charging. As shown, the battery wire 24 is not cut off except when the cut off relay $L^4$ pulls up which is only when the line wire is in use for conversation.

Referring to Fig. 4, 1, 2 and 3 represent telephones subscribers' stations connected by wires 4, 5 and 6 to the central telephone exchange 7, constituting the distributing center for the area in which local subscribers 1, 2, 3, etc. are located. Superposed upon this telephone system is a radio phone system comprising a central station 8 and subscribers' stations $1^a$, $2^a$, $3^a$, etc. The central radio station or exchange is provided with switchboards and a complete broadcasting equipment, and the subscribers' stations $1^a$, $2^a$, $3^a$, etc., are provided with receiving instruments all standardized for the same wave length, and adapted to respond to the waves radiated from the central station 8 or C. The interrelation between the telephone system and the radiophone system is by means of physical connections indicated at $1^b$, $2^b$, $3^b$ at the subscribers' stations, and multiples or trunk extensions 15 from the telephone exchange switchboards to the radiophone exchange switchboard in station No. 8. The detail of these connections will appear hereinafter, but it should be stated here that the system of connection is such that telephone wired traffic has the right of way over the wires, while the radio traffic has the right of way over the radio side of the system. The arrangement is such that the radio operator cannot interfere with telephone operation, nor can a telephone operator interfere with the radio operation, although under proper conditions, each can act freely by way of borrowing facilities from the other. At all times, should a question of precedence arise, the apparatus is arranged so as automatically to cut off the radio connections and to leave the wired lines clear for telephonic use.

Stations 12, 13 and 14 in this figure are typical of indifferently located district stations which may or may not be located in this particular district. As the figure is typical only, no attempt has been made to give the geographical location of such stations or to show the actual arrangement and distribution of the telephone center C through which final broadcasting to the subscribers must take place. The main purpose of this figure is to crystallize the method employed, by which the development of a very large number of unrelated individual receiving stations is replaced by an orderly system of distribution through the telephone centers, whereby the individual receiving instruments are localized, maintained, controlled, and supplied with definite service through regular channels, for which a definite charge can be made and collected in the manner usual in wired systems of communication. Inasmuch as the number of wave lengths available for transmission is limited in the present state of the art, advantage is taken of the organized system of wire distribution and localization to create a phantom system controlled and guided thereby.

Briefly stated, as indicated in Fig. 4, each radio central station C or radio department of a telephone exchange, is not only provided with broadcasting equipment for its subscribers, but also with radio receivers adjusted normally or permanently to the frequency allotted to such C stations. By means understood in the art, messages received at the radio central stations are relayed on their standard wave length to the local subscribers.

In Figs. 3 and 3ª it has been assumed that the subscriber would employ apparatus for demodulating double modulated carrier waves, including two detector tubes, the first of which takes off the intermediate frequency carrier waves upon which the audio modulations are imposed; and the second of which takes off the audio frequency modulations from the IF waves. It is desirable to lessen the amount of apparatus at the subscriber's station, and at the same time give the central office operators an opportunity to supervise by "listening in" on any message being received, and to meter the service in a simple and efficient manner. For these purposes, I have shown in Figs. 3ᵇ, 3ᶜ, 3ᵈ and 3ᵉ demodulating units located in part at the subscriber's station and in part at the central station, the operation being for the subscriber's unit demodulator to take off the modulated long or intermediate frequency waves and transmit them over his line wires to the central office where they are further demodulated by a cord circuit unit which is plugged on his line, (or the equivalent automatic switching apparatus). The second demodulator sends back audio frequency currents over the line wires to the subscriber's station, where they effect his ordinary telephone or any special form of receiver, including a table talker or loud speaker.

Referring to Fig. 3ᵇ, the subscriber's station A' is equipped with a radiophone receiving device including an antenna circuit 28, tuned as usual, and coupled by means of coils 29 to the input side or grid circuit 125—126 of the detector tube 85. The input circuit may be tuned by means of condenser 129, but it is to be understood that this condenser and also the tuning elements in the antenna circuit may be adjusted once for all if the subscribers all work on a constant frequency, as hereinbefore set forth. The plate circuit 127—128 of the tube 85 includes one winding 123 of a tuned filter coupler, the other side of which 121 is connected to extensions 18ᶜ and 19ᶜ of the subscriber's telephone line circuit 18—19. The coil 123 is shunted by a condenser 124, and the capacity and inductance are so adjusted that the short circuit thus formed is resonant to the intermediate frequency waves imposed on the short carrier waves reaching the subscriber's instrument through the antenna 28. The variable condenser 122 is included in series with the coil 121, because of the line connection, tuning of the line being accomplished at both ends as will presently appear.

At the central office, the line wires 18—19 are connected to any desired number of answering and multiple jacks typified by the single jack J', and is provided with extensions 18ª—19ª passing to the radio department or radio switchboard R in the upper part of the figure. The telephone jacks as in Fig. 3, are intended to be interconnected with other jacks for telephonic purposes through a standard cord circuit 20—21, 22—23, having terminal plugs P—P', and bridged by a common talking and signaling battery B, feeding through the two halves of repeating coil I and also feeding through a ring on which plug the test thimble on each jack to the cut off relay circuit 19ᵇ, so that whenever a plug is in a jack of the line 18—19, circuit from battery to the cut off relay L³ will be completed and the line relay L' with its connection to the main battery B will be cut off and removed entirely from the line. In this cut off portion of the cord circuit are inserted supervisory lamp signals, s—s' adapted to be shunted by contacts controlled by supervisory relays included in the conductors 22—23, respectively.

These relays respond to current in the subscribers' lines when they are interconnected, and the lamps light when the subscribers hang up their receivers.

On the radio switchboard R, the same line is provided with jacks typified by jacks J¹⁷—J¹⁸. As shown, these are in pairs, for convenience only, and to avoid putting a large number of contacts in one jack. The upper jack J¹⁷ is a duplicate of the telephone jack J', and has its contacts connected in parallel to the same conductors, respectively. Jack J¹⁸ is a radio jack pure and simple, and is connected to the same line wires 18ª—19ª through a tuned filter coupler composed of coils 115 and 117 and condensers 116 and 118. The elements 115 and 116 are employed in conjunction with the elements 121—122 at the subscriber's station to tune the line circuit to resonance at the frequency of the long waves sent forward as demodulated by the subscriber. The elements 116—117 at central are included in this figure between the line and the jack because by this means the tuning of the line can be made constant and adjusted once for all. The cord circuit adapted to cooperate with these twin jacks has corresponding twin plugs P$^{12}$—P$^{13}$ preferably connected mechanically so they can be inserted and removed from the jacks at the same time. The plug P$^{12}$ is the terminal of a standard talking circuit 90—91, with battery B bridged across it through coils 92—93, and provided with supervisory lamp 101, the controlling shunt therefor 102, the supervisory relay 103 and the talking shunt therefor 104, also with special test coil 106 supplied with a radio tone test through wire 108 from the commutator 107. When this plug is inserted in the jack J$^{17}$ the cut off relay L$^3$ of the telephone line is pulled up and the line cleared from all telephone switchboard connection, for radio use.

The plug P$^{13}$ forms the terminal of a radio detector circuit, the tip and sleeve of the plug being connected through conductors 96—97 with the grid and the filament respectively of the detector tube 86. The plate circuit 97—98 of this tube is connected to the outside terminals of coils 94—95 which with the bridged coil 92—93 form the usual repeating coil connection between two ends of the standard bridged battery cord circuit. The battery B bridged between the windings 94—95, has its positive terminal connected to the plate through coil 94 and wire 98, and the conductors 97—98 are bridged by a conductor 99 containing a by-pass condenser 100.

The result of this arrangement is as follows: The subscriber calls for radio service by moving his switchhook at station A', up and down rapidly. This flashes the line lamp before the telephone operator, who transfers the line over an order trunk to the radio operator, who thereupon inserts the twin plugs P$^{12}$—P$^{13}$ into the jacks J$^{17}$—J$^{18}$. This pulls up the cut off relay L$^3$, clears the line through from the substation to the cord circuit 90—91, 96—97, and thereupon, assuming that the subscriber has closed his filament circuit at the substation, radio waves reveiced on his antenna 28 are demodulated, and their long wave or intermediate frequency component, carrying the audio modulations, is transmitted to line through the filter coupler 121—123. From line it passes through the filter coupler 115—117 and through the wires 96—97 to the grid circuit of the tube 86. The varying potentials thus produced in the grid circuit of the tube are reproduced in the current changes in the circuit 97—95—B—94—98. The superaudio frequency waves are absorbed by the circuit 99 and the condenser 100, and pure audio frequency waves are propagated through the repeating coil 94—95—92—93, into the telephone line circuit, through the plug P$^{12}$, the jack J$^{17}$, multiple wires 18$^a$—19$^a$, and line circuit 18—19. At the subscriber's station these audio waves may be received on his ordinary telephone receiver 70 $a$, or upon any special form of receiver desired.

Referring now to Fig. 3$^c$, I have shown therein a modification of the circut of Fig. 3$^b$, in which the following features are introduced: First, I provide a feed back coil or tickler 130 at the subscriber's station; a special receiving telephone 133 with a terminal plug 132 adapted to be inserted in the jack 131 bridged across the telephone line outside of the filter coupler 121—123; and lastly I have removed the central office filter coupler 115—117 from its position between the line and the jack J$^{18}$ as in Fig. 3$^b$ and instead thereof have located this coupler in a bridge of the cord circuit 96—97, thus doing away with the twin plug P$^{13}$ and its connections. This also reduces the number of couplers required, and most important of all enables the complete radio cord circuit to be used with any ordinary telephone jack, since the terminal plug P$^{14}$ is an ordinary telephone terminal plug. For the reason stated, I have designated both jacks in this figure by the letter J$^1$, the lower one being at the telephone switchboard and the upper one at the radio switchboard. Both may be used interchangeably, or an ordinary telephone switchboard may be used for radio purposes without any change other than adding the filter coupler, the detector tube, and other connections to an ordinary standard answering plug cord. This interchangeability of the parts, makes it possible to give radio service on any telephone switchboard, using the same operators if desired, for both services. It also makes it possible to lengthen the life of a telephone switchboard by rewiring the cords and converting it into a radio switchboard.

In Fig. 3$^c$, the antenna circuit 28 and the coupler 29 are the same as before; the grid circuit is 125—126, the plate circuit 127—128 includes a tickler coil 130, and the other parts have been referred to. At the central station the plug P$^{14}$ is connected as in Fig. 3$^b$ to the repeating coil, battery, supervisory lamp, controlling relay therefor, tone test, etc. The coil 115$^a$ of the central office filter coupler is bridged across the terminals of the plug, with its tuning condenser 116$^a$. The twin number of the filter coupler 117$^a$, with its shunting tuning condenser 118$^a$, is bridged through conductors 96—97 across the grid circuit terminals of the tube 86. The plate circuit 97—98 is connected to the repeating coil in the cord, and in this case also includes a tickler coil 134, which may be cut in and out of the plate circuit at will by means of a switch 98ᶜ. This coil 134 feeds back into the grid circuit waves at intermediate frequency, as received over the line, and is intended to give a higher ratio of amplification in the audio current returned to the subscriber than would be possible without it. It should be noted however, that instead of thus using the regenerative principle, I contemplate employing radio and audio amplification in one or more stages of each, inserted between the detector tube 86 and the plug $P^{14}$ or $P^{12}$ (Fig. 3ᵇ).

In Fig. 3ᵈ I have shown a modification of the cord circuit in Fig. 3ᶜ, which consists in providing a separate battery $B^2$ for the plate circuit 97—98 of the tube. This battery is located next to the plate, and the by-pass condenser 100 is bridged across the terminals of the repeating coils 94—95. This approaches more nearly to the common or standard method of connecting circuits than the bridge circuit of Figs. 3ᵇ—3ᶜ, and while probably not more efficient is a little more flexible, as it permits the voltage of the $B^2$ battery to be varied at will, without reference to the voltage of the battery B which according to telephone practice is constant at about 22 volts. Thus if amplifier tubes are used between the tube 86 and the coils 94—95, a separate plate battery would be required for the amplifiers, giving a higher voltage according to common practice. The operation of Figs. 3ᶜ—3ᵈ is as follows: The subscriber may call as before and in response to his call the radio operator gives him a cord circuit with terminal plug $P^{14}$ or $P^{15}$, whereupon his unit through the detector tube 85 demodulates the short wave carrier received on antenna circuit 28, and sends the intermediate or long wave modulation thereof through the line wires to central, where it passes to the jack J' and the plug $P^{14}$ and is repeated by the tuned filter coupler $115^a$—$117^a$ into the grid circuit 96—97 of the tube 86. Through this tube, and any amplifying tubes which may be employed, the audio modulations are first detected and then amplified and sent back through the repeating coil to the plug $P^{14}$ and the jack J' to the subscriber's line. At the subscriber's station they are received either on his regular telephone receiver, or on the special telephone 133 which typifies any kind of receiver which it may be found expedient and desirable to employ.

I contemplate dividing the cord circuits shown in Figs. 3ᵇ, 3ᶜ, 3ᵈ, in classes, the first class being like those shown herein, without any amplification; the second class having sufficient audio amplification or radio amplification, or both, to insure good operation of the subscriber's table talker; and those of higher classes having more amplification, serving for the operation of loud speakers giving varying volumes of sound. This it may be stated that a No. 1 cord circuit would be as shown, with only one detector tube and the subscriber would therefor receive his audio message on a head telephone or on his ordinary telephone receiver held to his ear; with a No. 2 set at central there would be one stage of audio amplification sufficient at the subscriber's station for a table talker which would not annoy the neighbors; a No. 3 set would have sufficient amplification to actuate a reasonably loud speaker, while a No. 4 set might be so equipped as to fill a hall. For different classes of service as thus outlined, the subscriber should be charged different rates, as in long distance telephone service. It is very necessary that there be metering upon which to base the charges, since the service is a time service and not a message service. For thise purpose I contemplate including in each cord a distinctive type of meter actuator which will operate the subscriber's line meter, which may be his telephone meter or a separate meter as desired, a number of times per hour determined by the class of service he is receiving. Thus the No. 1 cord circuit may be connected to a commutator that closes the line meter circuit once every hour; No. 2 may have a meter actuator that works twice every hour; No. 3 may have an actuator that works three times in the hour; while No. 4 may have its actuator work every ten or twelve minutes. The reason for selecting these time divisions is that the average charge per message for telephone service is about five cents. At five cents per hour, and averaging three hours service per day, a subscriber's radio bill would be $4.50 per month. This is fairly comparable to the earnings of an average residence telephone for the same period, on a message rate basis. The fractions of time could not be cut below a five cent value, unless a separate radio meter be provided for each line and it is desired to avoid this expense, as well as the upkeep of one hundred per cent of additional meters. In prior copending applications Serial No. 581,831, filed August 14, 1922, and Serial No. 583,566, filed August 22, 1922, I have shown and described metering systems which are suitable for use with the system of circuits herein disclosed, and in another application Serial No. 746,358, filed October 28, 1924, based upon the same system of circuits herein disclosed, I have disclosed and shall claim the adaptation of these metering circuits to the present system.

It should be particularly noted, that a subscriber, (which term is meant to include any user) may not keep his radio phone in service a full hour, a pertinent example being that of a man who desires to obtain a baseball score or other special information.

A special provision should be made for registering such service, as it involves all the elements of expense to the operating company which would be included in a much longer connection. For this purpose the operator may have a push button $g$ connecting the actuating generator G direct to the meter circuit through the plug $P^{13}$, as shown in one form in Fig. $3^b$, together with the automatic actuating means for the meter, comprising the commutator $g'$ which at stated intervals connects the generator G to the wire 297 leading to the third contact on the plug $P^{13}$, which when the plug is inserted in jack $J^{18}$ completes the circuit from wire 297 through wire 298 to the cut off relay wire $19^b$, thence to the high winding 299 of the metter LM. In Fig. $3^b$ the meter is shown as the ordinary standard telephone line meter, which would thus serve a double purpose, registering both the telephone calls and also the time of radiophone use in terms of telephone call units or telephone message units. Such a meter by reason of the high resistance in its winding 299 will not respond to the battery current which energizes the cut off relay $L^3$, but when the operator connects a generator as G producing current of higher voltage, then the meter magnet becomes sufficiently energized to attract its armature and close the circuit of its low winding 300, the rush of current through the low winding producing strong and certain actuation of the meter counting device 301.

By thus having the operator always press the keys $g$ immediately after making a radiophone connection, there will always be made a base charge of one telephone message unit for the connection. If it should happen that the commutator close the actuating circuit immediately afterward, the meter would register two units for the first hour of use. If it should happen that the subscriber hang up in fifteen minutes the line would still bear the charge of two units for one hour. On the other hand, if the connection was made immediately after the commutator had closed the metering circuit, then no additional charge would be made for an hour, and if the subscriber should hang up within less than an hour, he would have only the one charge against the line. In any event, the charge would be safe to the company and fair to the subscriber as all public service corporations make a service charge if the measured rate charged is below a minimum amount. A commutator individual to each cord started when the cord is connected would of course register individual time use only.

Referring to Fig. $3^e$, this is a schematic diagram showing without detail the layout of the subscriber's line instruments and the central office radio connections just described and illustrated in Figs. $3^b$, $3^c$, and $3^d$. Line wires shown at 18—19 extend from the subscriber's station A' to the central office where they terminate on a jack J'. As the units of the apparatus are marked with legends specific description is unnecessary. The principal point is that no physical connection with the telephone line is made at either end except through a tuned filter coupler passing only superaudio frequencies.

Referring now to Figs. $5^a$ to $5^d$ inclusive. I have therein shown the arrangement of receiving and transmitting apparatus at the stations A, B, C, and D of Figs. 1, 2, $1^a$, $1^{aa}$. More particularly, these figures constitute a connecting link between Fig. $1^{aa}$ which is merely a skeleton, and the detail circuit figures which follow hereafter. Turning to Fig. $5^a$, I have shown therein an arrangement of originating broadcast transmitters at the head or master station A. The purpose is double modulation, by first modulating by means of a telephone transmitter upon a long wave, and then modulating the long wave upon a short carrier wave of suitable frequency to be received at the stations B. It goes without saying, that this same arrangement of apparatus will be found at each of the other central stations B and C, being indicated in Fig. $1^{aa}$ by the numeral 64. In order that this apparatus may also be employed for radio broadcasting of material brought into the stations over wired trunks, I show a jack $J^{10}$ (see right hand end of Fig. $1^{aa}$) connected through an amplifier to switch contacts which may be connected through amplifier switch arms to the primary of the transmitter induction coil 302, the secondary of which is connected to the modulator of the generating and transmitting set. Thus a trunk line or even a subscriber's wire may be plugged on to the modulator through the amplifier by means of jack $J^{10}$.

Fig. $5^b$ shows a relay apparatus primarily intended for use at stations B and C, but which will also be used at master station A. Fig. $5^c$ shows identical apparatus, except for the jacks 303 and 304, the purpose of which will be presently explained. These jacks can be used in the circuit of Fig. $5^c$ if desired.

The function of the apparatus of Fig. $5^b$ is to take double modulated waves at the frequency allotted to the receiving station, demodulate the short wave carrier so as to produce modulated intermediate frequency waves which are then passed through a tuned amplifier 305 to a modulator 306, by means of which they are modulated on a primary or short wave carrier of a frequency suitable for the next lower order of receiving stations, in this case C stations. The short waves thus modulated are then radiated.

By means of the jack 303, intermediate frequency or long waves modulated may be taken off a trunk and passed through the amplifier 305 to the modulator 306 and thence radiated as before. Also, by means of the jack 304 intermediate frequency or long waves modulated which have passed through the demodulator 307 and the amplifier 305 may be forthwith placed upon the wire trunk lines for transmission to other stations. These extensions should be available at each stage in the system, and I consider it original with me to provide means for affecting these combinations of superaudio frequency modulated waves transmitted either from wires to radio carrier or from radio carrier to wires without change either in the intermediate frequency waves or in their modulations, and shall claim the same accordingly. This is one essential feature of the present system, which it is believed should be adhered to in any system of organized broadcasting, i. e. that when an original modulation is once made, the wave train carrying that modulation should be preserved unchanged throughout its entire course from point of origin to the listener's ears. As described herein, I accomplish this by means of double modulation, with superaudio modulated waves modulated upon the high frequency radio carrier. I shall presently show that single modulated waves can be received and relayed with the same ultimate effect. I consider, however, that the method of double modulation is the best and most perfect for this purpose.

Referring to Fig. 5$^d$, this shows typically a subscriber's apparatus for taking double modulated waves sent out from the stations of any of the preceding three figures, and demodulating the same so as to recover the original audio modulations and make them apparent. There are two units, one a demodulator of the short carrier wave, which produces the long intermediate frequency wave carrying the original audio modulations, and passes these to the second demodulator, which demodulates the intermediate waves and passes the audio waves to the telephone receiver shown at the right of the figure. This method is shown in detail in Fig. 3$^a$ at the subscriber's station, where the circuit arrangement of such a double demodulator is illustrated in full.

Figs. 3$^b$ to 3$^e$ inclusive already described, show modified forms of double demodulator in which one unit only is at the subscriber's station and the second unit at the central office. For a number of purposes these are preferred forms, but no one of these is exclusive as any of them may be used in the system.

Fig. 6 shows an arrangement whereby at any of the sending stations any single modulated wave may be picked up on the receiving antenna, heterodyned to produce a high frequency wave with a beat envelope, said frequency being the mean of the frequency of the original waves received, and that of the heterodyning oscillator employed. The beat envelope in such case carries the original modulations, and by amplifying the mean frequency wave, with its beat wave envelope, as indicated in this figure, it can be radiated as a carrier wave bearing double modulations. I believe this method of relaying to be novel and original with me and shall claim the same accordingly.

Fig. 7 shows still another way of producing double modulation in relaying a single modulated carrier wave. In this case the original carrier wave is received, detected and heterodyned, to produce a beat wave which is then passed through a tuned filter coupler 309, to an amplifier 310, and thence to a modulator 311 by which it is imposed upon a short or primary carrier wave through the oscillator transmitter 312 and finally radiated through the antenna 313. I shall also claim this method.

In order that the organization of stations illustrated in Figs. 1 to 4 may not be understood as dependent entirely upon double modulation, I show in Fig. 7$^b$ a schematic diagram of apparatus for stations A, B or C, employing single modulated carrier waves throughout. In relaying such waves, they are first demodulated at 314, then the modulations pass through an audio amplifier 315, and by means of a modulator 316 are imposed as single modulations upon a carrier wave produced and radiated by the transmitter 317.

The sheet of drawings containing Figs. 5$^a$ to 7$^b$, has been inserted for the purpose of presenting to the eye in condensed form, the essential features of the apparatus, and thereby conveying without detail, a clear idea of the methods employed at the several stations. The detail of these figures is shown in the following diagrams.

Fig. 5$^{aa}$ illustrates the details of a circuit arrangement which will realize the functions called for by Fig. 5$^a$. Primarily, of course, the purpose of this assemblage of apparatus is to produce double modulation of a primary or short carrier wave, that is to say, to modulate a relatively long wave carrier, and then modulate this long wave upon a relatively short wave carrier which may conveniently be radiated in the usual fashion. Means for receiving and demodulating such double modulated waves have been described in connection with Fig. 3$^a$ and will be further described herein. In Fig. 5$^{aa}$, 150 is a microphone transmitter in a local circuit 151 supplied with energy by battery B$^4$ and containing the primary winding of an induction coil 152, the secondary of which is connected in the grid circuit 153 of the modulator tube 154, said circuit containing a battery B⁵. The plate circuit 155—156 of the tube 154 is bridged by the power battery B⁶ and choke coils 157, and is connected through radio jack coil 157ᵃ, to the plate of the long wave oscillator tube 158. The grid circuit of the tube 158 contains a battery B⁷, is differentially connected to one coil of the coupler 161, which in turn has a wire connection 160 back to the plate circuit. The coupler 161 is tuned on its input side to the long wave frequency supplied by the tube 158, and its secondary winding is connected to the grid circuit of a second modulator tube 162, containing a battery B⁷⁰. The plate circuit of the tube 162 is bridged by power battery B⁹ and choke coil 163, and is connected through the radio choke coil 163ᵃ to the plate of the short wave oscillator tube 164. The grid circuit of this tube 164 contains a battery B¹⁰ and is connected through a condenser 167ᵃ and wire 167 to the antenna circuit, which is also connected back to the plate circuit through wire 166. The antenna circuit 57 is thus supplied with short wave oscillations modulated by the tube 162 with long wave oscillations which in turn have been modulated by the tube 154 with audio modulations due to the primary modulator or microphone transmitter 150. It should be noted that this circuit is an adaptation of the Heising modulator circuit in common use, and it is not claimed herein, being shown for example on page 682 of the work on "Principles of Radio Communication" by J. H. Morecroft, published by John Wiley & Sons, New York, 1921. The use of this apparatus however in combination with other elements to produce the results stated, and the adaptation of the circuit in question to the purposes of this system, are novel and will be claimed herein.

A modification of this circuit which permits general broadcasting by single modulation, and at the same time double modulation for broadcasting to subscribers, is indicated in Fig. 5ᶜᶜ. Here the transmitter 150 is shown working through the induction coil 152 into the modulator designated generally as 154, the oscillator 158 and the modulator 162 into the short wave oscillator 164, all as per diagram Fig. 5ᵃᵃ. The transmitter circuit 151 however, is branched through a switch 151ˢ to a second coil 152ᵃ, by which the same audio modulations are repeated into the modulator 154ᵃ and thence into the circuit of the short wave oscillator 164, in this way imposing the audio modulations due to the transmitter 150 directly upon the short carrier wave radiated from the antenna circuit 57. This wave as it goes out will therefor carry both long carrier wave modulations and audio modulations, and the long carrier wave in turn will also carry the same audio modulations. Receiving devices of the ordinary type, adapted for single demodulation only, can receive the audio messages conveyed in this way. By means of the switch 151ˢ however, the operator can cut off the audio modulator and restrict any part of the broadcast program to the double modulating circuit, for reception only by those who have double demodulating receivers.

The apparatus shown in Figs. 5ᵇ, and 5ᶜ, is intended to receive a double modulated carrier wave such as that radiated from the antenna in Fig. 5ᵃ, demodulate the same and reimpose the long wave or intermediate frequency, with its modulations, upon another short wave carrier which in the apparatus of Fig. 5ᵇ is supposed to be the carrier wave of a frequency allocated to stations C, while in the apparatus of Fig. 5ᶜ this is supposed to be the carrier wave of a frequency allocated to the subscribers' stations D. Glancing at the four figures, 5ᵃ, 5ᵇ, 5ᶜ, and 5ᵈ, it will be observed that from the original modulation due to the transmitter 150 to the final demodulation by the intermediate wave demodulator in Fig. 5ᵈ, the same intermediate long wave carrier, and the same audio modulations thereof, are maintained intact and unmodified, being merely passed along by relaying from station to station on short carrier waves, or as hereinbefore described on wired trunk lines as the equivalent of the carrier waves.

The apparatus is Fig. 5ᵇ and that in Fig. 5ᶜ is identical except for the tuning of the transmitted carrier wave. The description of one therefore will suffice for both.

Referring to Fig. 5ᵇᵇ, which is a detailed circuit applicable to both these figures, 54 is the receiving antenna coupled at 174 to the grid circuit of the detector 170, whose plate circuit is connected through a tuned filter coupler 175 to the grid circuit of the amplifier tube 171, whose plate circuit is connected through the transformer 176 to the grid circuit of the modulator tube 172, which in turn has the usual Heising connections 178—179 to the circuit of the oscillator tube 173; the radio choke coil 178, the power battery B¹⁴ and the magnetic choke coil 177 being arranged as usual. The grid and plate of the oscillator tube 173 are connected to the antenna inductance coil 180, which with the usual tuning condenser 180ᵃ is included in the antenna circuit 55. Filament batteries B¹¹, B¹³, and B¹⁵, and plate batteries B¹² and B¹⁶ are located as usual. As thus described, the assemblage constitutes a relay set which will take in the modulated long waves on a short wave carrier, and retransmit them on a carrier of different frequency, without demodulating or disturbing the modulations of the intermediate or long wave. In order that these long waves may be transferred from the first detector circuit to trunks or to recording devices, and in order that modulated long waves brought in by trunks or produced by reproductions of records, may be placed on the radiating antenna 55, I provide connections symbolized as jacks $J^9$—$J^{90}$. The jack $J^9$ has its springs connected to the terminals of the coupler 175, and these springs normally rest upon contacts in the plate circuit of the tube 170. The jack $J^{90}$ has its springs connected to the terminal of the coupler 176, and these springs normally rest on contacts connected in the grid circuit of the modulator tube 172. Trunks such as 50 and 51 terminate on jacks $J^6$ and $J^7$, (see Fig. $1^{aa}$), adapted to be interconnected with each other or with the jacks $J^9$ and $J^{90}$ by plugs and cords as indicated at $P^5$ and $P^6$. By plugging either one of the trunk jacks $J^6$ or $J^7$ onto jack $J^9$, the corresponding trunk line will be connected to the tuned filter coupler 175, whose windings are simultaneously disconnected from the detector tube 170. Thus modulated carrier current at the same frequency as the intermediate waves used in the radio side of the system, will come over the trunk line 50, for example, through the jacks $J^6$ and $J^9$ and plugs $P^5$ and $P^6$, and so to the coil 175, whence the long waves will pass to the grid circuit of the amplifier tube 171, to be amplified and then sent through the modulator and oscillator circuits of tubes 172 and 173 Any incoming trunk material can in this way be put "on the air" at any station having the relay apparatus of Fig. $5^{bb}$ or the equivalent thereof. For reverse operation, by plugging either one of the trunk jacks $J^6$ or $J^7$ on to the jack $J^{90}$, the corresponding trunk, as 57 for example, becomes connected through plug $P^6$ and plug $P^5$ to plug $J^{90}$ and therethrough to the coil 176, whose primary winding is simultaneously disconnected from the grid circuit of the modulator tube 172. The incoming modulated short carrier waves received on the antenna 54 will pass through the detector 170 and by demodulation of the primary carrier long intermediate frequency waves will be passed through the filter coupler 175, amplified by the tube 171, and so communicated through the coupler 176 to the cord circuit and jacks, directly to the trunk line 51. In this way, material can be taken "off the air" at any time and put on the trunks by simply obliterating the primary carrier wave. It is to be understood that by varying the tuning of the couplers, long waves of any frequency can be taken from or fed onto the trunks.

It has been pointed out hereinbefore that for proper coordination between the four time divisions of our country, there must be repetition of at least some portions of the general program, at intervals of one hour, so as to allow for the elapsed time between the same clock hours in any two successive divisions. There are many items on a radio program that can very advantageously be recorded and released thereafter. Among these are news items, some musical programs and the like. It is also pointed out that an advantage inheres in this repetition over different parts of the system, in that there are multiplied chances of subscribers in any division receiving items which they have missed during previous broadcasting. Circuit arrangements for rendering this method of recording practical are shown in Fig. $5^{bb}$, symbolically. Jacks $J^{60}$ and $J^{70}$ are provided for the recording and reproducing apparatus respectively. $J^{60}$ is connected to a unit 320 containing a detector and audio amplifier, the output side of which is connected to a second unit 321 containing a recorder. As a modification of this arrangement, the detector feed may be omitted from unit 320 and the audio amplifier be replaced by an amplifier adapted for the intermediate or long wave frequencies. The recorder 321, which may be a light recorder operating photographically, a mechanical shutter device, or of any other desired type, including the cut record apparatus of the Victor Phonograph Company, will then record the long secondary waves with the audio modulations on them. While this requires delicate apparatus and parts having a high natural period, it is pointed out that these long waves are usually for expediency brought down as low in frequency as possible above the audio range, and that satisfactory records can be made by any of the methods mentioned, especially the phonographic method, throughout the entire audio range and above it. Thus, either the audio modulations of the long waves, or the long waves themselves stripped off the primary carrier or taken over the trunks, may be recorded by the units 321. According to late practice, which is unnecessary to describe in detail, such a record is made by means of photographing on a ribbon which can be of any desired length, so that considerable portions or all of the programs may be preserved and repeated when desired.

The jack $J^{70}$ is connected to the output terminal of unit 322 containing an intermediate frequency or long wave oscillator, having its input terminals connected to a modulator 323 connected in turn to the reproducer 324 of the record previously made by the unit 321. These units are all shown as squares, in symbolic fashion as no claim is made to the details of their construction or operation, which are well understood in the art. It will now be noted that a record having been made, can be placed in the reproducer 324 which will work the modulator 323 in conjunction with the long wave oscillator 322, so as to produce intermediate frequency or long carrier waves modulated with the original audio modulations carried by the record. These long waves may be placed as carrier current upon the trunk lines, or by connecting the jacks $J^{70}$ and $J^9$, they will pass through the filter coupler 175 to the amplifier 171, the modulator 172, and the oscillator 173, and so be modulated upon a short carrier wave which is then radiated from the antenna 55. It is to be specially marked that the apparatus of Fig. $5^{bb}$ can be located to advantage either at a transmitting B station, or at a receiving B station for deferred transmission. The latter is at present considered preferable. Supposed for example, that the master B station for division one (eastern standard time) is broadcasting a philharmonic concert. This is timed for eight o'clock, and as it is received at the master B station for division two, it is only seven o'clock, and when received for division three, it is six o'clock, and in division four, it is five o'clock. We may assume that division two picks up the primary waves, on an antenna such as 54, and by plugging from jack $J^{90}$ to the jack $J^{60}$, amplifies, detects again, and records audio modulations. One hour later, this record is placed in the machine 324, and the jack $J^{70}$ is plugged up to the jack $J^9$, whereupon the record is reproduced, operates the modulator 323 and the oscillator 322, sends long waves through the filter coupler 175, the amplifier 171, and the coupler 175 to the high frequency modulator oscillator 172, 173, thus modulating the reproduced waves on a short wave carrier which is finally radiated from the antenna 55. Thus, the mechanism shown in Fig. $5^{bb}$ contains within itself all the elements necessary for instantaneous or deferred relaying; for transfer from the receiving antenna to a trunk or trunks, of modulated superaudio carrier current; for transfer of modulated superaudio carrier current or waves from a trunk or trunks by modulation on to a short carrier wave, to the antenna 55 for radiation; for transfer from trunk to trunk between the stations of audio or superaudio modulated waves or carrier current; for detecting and recording matter received by radio over the antenna 54; for receiving and recording matter received by the carrier current over any of the trunks; and for reproducing and transmitting by pure radio or over trunks matters previously received and recorded. It will be understood of course that the mechanism and circuits described are typical only, and in this specific form are used for purposes of definition and not of limitation. Thus, many different arrangements of tubes, the multiplication of units in amplifiers and the like, and the multiplication of units as a whole so that separate sets can be used for recording and trunking and the like, are possible, and all such arrangements and modifications are to be understood as within the scope of my invention. I consider the arrangement and combinations shown in Fig. $5^{bb}$ to be new and original with me and shall claim the same accordingly.

Referring to Figs. $6^a$ and $6^{aa}$, these show details of the parts symbolized in Fig. 6. This figure and Fig. 7 illustrate apparatus intended to receive single modulated waves, and to relay by double modulation, carrying the same audio modulations. Referring to Fig. $6^a$, 185 is the receiving antenna with coupler 186 connecting it to the detector tube 181 which has a triple coil oscillator coupler 187, 182 being the oscillator for producing local heterodyning waves. The detector circuit and the oscillator circuit are connected to the tuned filter coupler 188, the output side of which is connected to the grid circuit of the amplifier tube 183, the plate circuit of which is in turn connected through a tuned radio frequency transformer to the grid circuit of the amplifying tube 184, the plate circuit of which goes to the antenna 191. $B^{17}$ is the plate battery of the oscillator and the first tube 181, which, while I have called it a detector because it occupies that position, may be regarded rather as an amplifying tube, since it is worked by preference on the straight portion of the characteristic tube curve, for purposes which will appear. The battery $B^{18}$ is a filament battery for tubes 181 and 182. Battery $B^{19}$ and battery $B^{20}$ are filament batteries for the tubes 183—184 respectively, while $B^{21}$ and $B^{22}$ are the plate batteries for the same. The antenna circuit radiates at a frequency determined by the tuning of the circuit 190, and it is to be observed that with this arrangement the radiated frequency is not the beat wave between the incoming wave from antenna 185 and the frequency produced by the oscillator 182, but is the mean frequency between these two, and also that the filter coupler 188 is tuned sharply to this frequency. In these respects, the apparatus of Fig. $6^a$ is very different from an ordinary superheterodyne set, which invariably makes use of the beat wave. In this case the beat wave is not taken off, but appears as an envelope on the mean frequency which is the carrier wave produced, amplified and radiated by the machine from the antenna 191. In other words, by heterodyning and then amplifying and radiating the wave carrying the original modulations, I produce what is really a double modulated carrier wave, since the mean frequency wave has an envelope corresponding exactly to the wave or beat frequency between the original carrier and the heterodyning oscillator waves.

Referring to Fig. 6$^{aa}$ the apparatus therein is a modification of what is shown in Fig. 6$^a$ but using autodyne receiving tube 182 instead of two tubes shown in Fig. 6$^a$. In this case the tube 182 is said to oscillate at the heterodyning frequency, while the circuit 186$^a$—187$^a$ is tuned to the frequency of the incoming carrier wave. A resultant or mean frequency wave is produced, carrying the original modulations, and having an envelope of the frequency of the beat. This wave is propagated through the coupler 188 into the grid circuit of the tube 183, which is the first amplifier tube, and from thereon the operation is the same as described of Fig. 6$^a$. Tubes 182—184 are the amplifiers and 190—191 is the radiating circuit.

According to my present knowledge it is broadly new to thus receive and heterodyne a single modulated carrier wave, and then amplify and throw out the mean frequency wave produced in heterodyning, with a beat frequency envelope, having the original modulations thereon. In relaying, one difficulty to be met has been the liability to regenerative action, and it has been found difficult to prevent waves from the sending antenna affecting the receiving antenna circuit if they were tuned to the same frequency. By this method of operation, the incoming waves are heterodyned and amplified and sent out again without demodulation, but with a change in frequency equivalent to one-half the beat frequency between the original and the heterodyning oscillating frequencies. This is sufficient to prevent regeneration, and has the added advantage of producing waves which require double demodulation.

Referring now to Fig. 7$^a$, this is the detailed circuit diagram for Fig. 7. The receiving antenna 200 is connected through coupler 201 to the grid circuit of the first detector 203, the input circuit being tuned by means of a variable condenser 202 as usual. The plate circuit of the detector 203 is connected to the tuned filter coupler 210, and the grid or input circuit is coupled through a triple coil coupler to the oscillator 204. The other side of the filter coupler 210 is connected to the grid circuit of the amplifying tube 205, the plate circuit of which goes to the transformer 211, the secondary of which is connected to the grid circuit of the amplifier tube 206, whose plate circuit is in turn connected to the transformer 212, the secondary of which feeds the grid circuit of the modulator tube 207, which is connected in a Heising transmission circuit including the oscillator tube 208, and the radiating circuit 215. The plate circuit of the oscillator tube 207 has the usual power battery B$^{29}$ and choke coil 213, while the oscillating circuit of the tube 208 includes the resistance coil 214 and the tuning elements of the antenna circuit. Battery B$^{25}$ is the plate battery of the tube 203, battery B$^{26}$ is the filament battery, common to the tubes 203—204, and battery B$^{24}$ taken with the battery B$^{25}$ in series constitutes the plate battery of the oscillator tube 204. B$^{27}$ is the filament battery of the amplifier tubes, B$^{23}$ is the high voltage plate battery of the same, B$^{29}$ is the power battery of the modulator oscillator circuit while battery B$^{30}$ is a grid battery for the oscillator tube 208. B$^{28}$ is the filament battery for the same tube.

This arrangement of Fig. 7$^a$ is the same as the ordinary superheterodyne circuit up to the tube 207. According to usual practice this tube would be a second detector and would be followed by one or more stages of audio amplification. In the present case this tube is a modulator, which takes the beat waves passed through the tuned filter coupler 210, and amplified in the tubes 205—206, and imposed them on the high frequency carrier current generated by the tube 208 and radiated from the antenna 215. This shows another method of taking a single modulated incoming wave and by heterodyning and remodulating, sending out the same audio modulations unchanged on a different carrier wave. The waves radiated from the antenna 215 also require receiving instruments capable of double demodulation. I shall also claim this arrangement as original.

Referring to Fig. 1$^{aa}$ in passing, and in connection with the description of Fig. 5$^{bb}$ it is to be noted that the recorder and reproducer are indicated in Fig. 1$^{aa}$ at 321 and 324 with terminal jacks J$^{60}$ and J$^{70}$ respectively.

In Figs. 3$^g$, and 3$^h$, are shown other forms of complementary central and subscriber's apparatus for furnishing the subscriber with radio service controlled from the central office or service station. In Fig. 3$^g$, the central office apparatus comprises a first detector and amplifier set 400 having its input circuit coupled to an antenna 401 through a primary coupling coil 402 and its output circuit terminating in a plug 403 adapted to engage with a multiple jack 404 of the line multiples 405 of a subscriber's line 406. Several of the sets 400 may be supplied from the antenna 401 through other primary coupling coils such as 407 of which many may be included in the one antenna circuit. By the use of the plug and jack connections 403—404, the sets such as 400 may be interchangeably connected with the different line, or multiple jacks, and it is to be understood that in place of the plug and jack connections any known or other suitable form of manual or automatic switching means may be used such as various forms of plugs, keys, or automatic switches. As the set 400 is a first detector and amplifier, when connected with the line 406, it sends over the line only the intermediate long wave. The subscriber's set 408 therefor comprises a second detector arranged to demodulate the long wave and detect the signal modulated thereon, the signal being received by the subscriber through the telephone headset 409 which of course typifies any form of receiving device such as headset or loud speaker. For supervision from the service station of the quality of reception at the subscriber's station, the subscriber's set 408 is provided with a double pole switch, or the equivalent, 410 for connecting the subscriber's line 406 through a pair of multiple wires 411 to the secondary of an induction coil 412 whose primary is connected through a double pole switch 413 to the circuit of the subscriber's radio telephone 409. Closure of the switches 410—413 will therefor effect a multiple extension of the subscriber's telephone receiver circuit to the central office or service station by way of his line 406 and through the jack and plug connection 403—404 to the listening key springs 414 associated with plug 403, so that an operator at the service station may, by actuating the listening key springs 414, to engage with the contacts 415, connect the listening set 416 to this extension circuit and listen in and determine the quality of reception at the subscriber's station.

In the arrangement of Fig. 3ʰ, all the radio apparatus is at the central office and takes the form of a complete double demodulator and amplifier set 417 terminating in a plug 418 adapted to engage with the subscriber's multiple jacks 419 and to connect the audio output circuit to the subscriber's line which is received at the subscriber's station through the subscriber's radio listening set which comprises simply a telephone headset 420 which typifies any known or other suitable form of telephone receiving device such as a loud speaker. As in all the other arrangements of central office apparatus, the double modulator and amplifier sets 417 are arranged to be interchangeably connected with different lines through the plug and jack connections 418—419 which, it is to be understood, may be substituted by other forms of manual or automatic switching means such as hand operated keys, or automatic switches capable of connecting a set 417 with any one of a number of line terminals, or a set of line terminals with any one of a number of sets like 417. In the arrangement of Fig. 3ʰ, the operator at the central office may supervise the operation of the circuit by listening in directly on the line in the manner usual in telephone practice without the subscriber's aid, as in this case the audio signal is always on the line. To prevent the completion of a metallic bridge across the line during use of the subscriber's headset 420 only, a telephone condenser 421 is inserted in series therewith.

In Fig. 3ʰ, the receiving set 417 is shown complete, with the audio output passing directly to the subscriber's line through plug and jack 418—419. As a modification of this arrangement, which at present I consider preferable in practice, another stage of audio amplification is provided between the jack 419 and the subscriber's line connections thereto, as a permanent part of the radio switchboard installation. In such case the jack springs are connected to the grid and filament return of the vacuum tube, and the plate circuit with filament return is connected to line. This means one vacuum tube per line, and if automatic switching is employed, one automatic switch per line, controlled by the subscriber to connect his line to the receiver 417, or to any one of a number of such receivers, from which he can derive different items of program at any given time. Preferably, each line amplifier tube is normally disconnected both from the line wires on the plate side, and from the radio receiving circuits on the grid or input side. When a subscriber desires radio service, with such an equipment, he first determines what program or what items of programs he desires, which are accessible by switching at the central office. He then calls up the operator, or makes and breaks his circuit to actuate the above mentioned automatic switch, which performs the following functions: first, it moves around over contacts connected to the several radio receivers until it reaches one from which he desires to take; second, it closes the plate circuit of the line tube, to line; third, it closes the filament circuit of the tube; fourth, it closes the circuit of the telephone switchboard cut-off relay of the line, and at the same time puts on a characteristic radio busy test on the telephone switchboard multiple jacks. The connection of the line tube both ways may be, and preferably is controlled not by the switch directly, but by means of a cut-on relay containing at least three pairs of make contacts, two of which act to close the plate circuit of the line tube to the line, and the third one acts to close the circuit of the telephone switchboard cut-off relay. The cut-on (radio) relay and the cut-off (telephone) relay, should not be energized until the selection by the subscriber of his program, etc., is complete; and at the same time there must be releasing means for the switch, of which there are numerous types known in the art, and this switch must not operate until the subscriber finally clears out and breaks his line circuit by disconnecting his radio instrument and hanging up his telephone receiver. The best means for accomplishing this in metallic circuit operation is a retarded relay or solenoid connected in or to the same circuit as the stepping magnet of the switch, which is preferably controlled by the subscriber's ordinary telephone line relay. When the first closure comes, the solenoid pulls up and stays pulled, cutting off the release magnet. The short breaks of the metallic circuit employe for stepping the switch around do not affect the solenoid or release magnet, but a long break due to the hanging up of the subscriber's telephone receiver will allow the solenoid to completely retract, closing the release magnet circuit, which in turn will restore the switch to zero or inoperative position. If it be desired to maintain the connecting circuit from the line to the radio receiver open until full selection has been accomplished a second solenoid may be employed, operating on short makes instead of short breaks, in other words, two oppositely acting solenoids, both fully energized to pull up at the first impulse closing or opening the line as the case may be, the one being deenergized when the line remains closed, for a definite length of time, and the other becoming deenergized when the line remains open or broken for a definite length of time. Such an arrangement for example is shown in Letters Patent granted to me, Nos. 1,107,138, patented August 11, 1914; 1,107,139, patented August 11, 1914; 1,107,140, patented August 11, 1914, and 1,107,154, patented August 11, 1914. Other arrangements of automatic and manual switches may be used for the same purpose, and while the same are not claimed herein this disclosure is made for the principal purpose of completing the variations that may be made in subscriber distribution without departing from the spirit of the main system which is the subject of this application.

The general operation of the system thus described will now be understood. The main underlying idea is that of a mixed wire and radio system organized so that the characteristic properties of each of these elements are utilized in the combination to the best advantage, and defects and disadvantages of either are eliminated. According to the principle laid down in my prior application aforesaid, Serial Number 581,829, pure radio transmission is used for the broadcasting from center to scattered units, and wire transmission from units to center; but this is expanded by successive steps of relay distribution outward, and selection inward, so as to cover a large area such as that of the United States, in which not only are successive steps in distribution necessary, but divisions of the territory according to time become important.

The master, or A station, which is preferably equipped with all of the apparatus indicated in Figs. 5ª, 5ᵇ, 5ᵈ, 6, 7, and 7ᵇ, broadcasts items as follows: (a) received from abroad or from outside stations; (b) received from any part of the system by prearrangement and routed as hereinbefore described through C and B stations; (c) originating at A; (d) received from points in the system as "specials", for either general or limited distribution. For purposes of (a) the apparatus of Figs. 6, 7, or 7ᵇ would ordinarily be employed, items received by wire being regarded as within the system. For items to be accepted and released later, and for all emergency items subject to same handling, the apparatus of Figs. 5ᵇ and 5ᵇᵇ would be employed, first recording and then releasing by transmission reproducer. For the purposes of (b) the apparatus of Figs. 5ᵇ, 5ᶜ, and 5ᵇᵇ, or its equivalent, would be employed. Ordinarily, items collected, through the system would come into A over the wire trunks and would be divided into two classes: (a) those to be relayed directly and (b) those to be recorded and released later. The former, if of general interest, would be passed through from a trunk such as 50 in Fig. 5ᵇᵇ, to the jack Jᵒ and thence through the amplifier, modulator and oscillator to be radiated. This radiation would be in waves of B frequency, and without other distinctions would be picked up by all the B stations, or at least the head B stations, for relaying, as by their apparatus shown in Fig. 5ᵇ, to the C stations and thence by means of their relay apparatus such as that shown in Fig. 5ᶜ, to the subscribers. In practice there will be a division of such broadcasting, as to items of importance, so as to give them their proper time of distribution in the several divisions of the territory. The principal methods for this are as follows: (a) to repeat such items or numbers at intervals one hour apart, or if two divisions are served at once, two hours apart. This would mean a compromise between the eastern division and the central division as to the time of transmission, making half hour changes instead of one hour changes; and the same between the mountain and Pacific coast divisions. (b) to record the items at audio or by preference superaudio frequency, and release them by such apparatus as that marked 322, 323, 324 in Fig. 5ᵇᵇ, at such intervals as may be desired.

As a matter of expediency, the compromise method of regulating the time of a performance of any kind so that it may be broadcasted in all the divisions simultaneously will probably be practiced until the public has become accustomed to an organized system. It is not in keeping with the spirit of this system however, except in matters of first class importance to the nation at large, to permit deviation from regular order of programs. In order to avoid this, and at the same time permit those who desire to hear the program or item in question when originally rendered, it will be broadcasted once directly from the performer or instrument, this being done at such a time that reproductions can be used for broadcasting in other divisions in order of their clock times. This would mean that grand opera booked as an item by the radio broadcasting company, but given in San Francisco, might be performed at 5 o'clock Pacific coast time, which would be 8 o'clock in the eastern division, 7 in the central, and 6 in the mountain division. B stations in the three eastern divisions as well as the coast division would have this on their daily dispatch sheets for release by relaying at the actual time of performance; but for the benefit of those unable or unwilling to attend at this time, the performance would be recorded by such apparatus as that shown in 320, 321 of Fig. 5bb, and subsequently released through the reproducing apparatus 322, 323, 324 at the theoretical or clock time, for performance in each division respectively. This same arrangement takes care of items originating in any one of the four divisions, whether later or earlier in point of time.

The foregoing description, while addressed primarily to broadcasting from station A, includes items drawn from different parts of the system, which implies transmission through B stations from C stations, either by wire or by radio. In the latter case, for direct transmission and broadcasting the station A would become in effect a relay station, as well as a record and repeating station.

(c) matters originating at station A are handled by means of the apparatus of Figs. 5ª and 5ᵃᵃ, but may also be handled by plugging the transmitter 64 with its amplifier 72 and intermediate frequency modulator and oscillator 71 onto a trunk or trunks 51 leading to B stations, from which the actual broadcasting can be done by connecting trunks to their intermediate wave amplifiers and the modulators and oscillators of their short carrier waves. (See Figs. 1ᵃᵃ and 5ᵇᵇ.) In other words, the station A can either broadcast direct or by wire trunking through the B stations, preferably the head B station of each division. It is further to be noted that the A station when so working over wire trunks can receive the same waves radiated from B or antenna 56 (Fig. 1ª) and by demodulating and listening to the audio frequency component thereof can determine the efficiency of transmission and the tuning of the B apparatus with respect to the short carrier wave employed.

Each station B is supposed to be a district station, that is, it compiles and checks up all bookings or "regular number" items in its district, keeps the A station informed thereof, makes up district programs, supervises local or C programs including items to be recorded and released later, receives, records and forwards traffic reports and charges from its district to A and acts as a relay station for mixed wire and radio transmission between the C stations in its district and the rest of the system. The relation of the B and C stations to each other and their operation will be better understood after an explanation of the last two sheets of drawing herein, containing Figs. 8, 8ª, 8ᵃᵃ and 9, 9ª, and 9ᵃᵃ, as well as a statement of the manner of employing primary and intermediate frequencies for distribution without interference. First, however, the functions of the C stations should be fully understood. These are the stations which come into immediate contact with the subscriber, and which for transmission purposes form their immediate source of supply. So far as the general broadcasting goes, these stations will be largely considered as they are described in my Patent No. 1,522,357, viz, as relay or distributing stations, each for its own local area. In speaking generally of these stations it will be understood that they may or may not be identical with the telephone central stations for the same areas. In the majority of cases each radio C station will be one of a group of telephone exchange stations in its area, and will receive communications from all parts of the area except its own particular territory, by trunking. Such an arrangement is symbolized in Fig. 2ª on the left hand side of the figure, where station C is the head or intermediate station for branch exchanges C' and C². As there are approximately 10,000 telephone exchanges in the United States, of which approximately 5,000 it may be be estimated, will be available as C stations in this system, the importance of having them properly organized and related to each other as well as to the subscribers will be apparent. The functions of each radio exchange C include the following: Relay broadcasting on the subscribers' or D carrier wave frequency of program items originating at B or A stations; selection of items and arrangement of local programs to include approved local items if any; listening in and supervising reception by subscribers, using the wire lines for this purpose; connecting subscribers' wires or studio wires to trunk lines for direct communication or preferably through amplifier modulator and transmitter units 65 and 66, for superaudio carrier current transmission over trunk lines 50 or to local broadcasting transmitters T as indicated in Fig. 1ª; rendering special service by broadcasting out with wire return, for special groups of subscribers holding meetings and the like, using special carrier-wave frequencies, or special intermediate frequencies for this purpose: metering all service, regular or special, and billing same, preferably through the financial department of the associated telephone operating company; installing, inspecting, testing and maintaining subscribers' station equipment; and compiling, editing and publishing in the press, by wire, and otherwise, the radio programs for the local area served.

A brief review of these functions will show the advantage in reduction of expense and added efficiency to both the telephone and the radio administrations of combined operation. In the single matter of metering and billing, it is to be noted that since provision is herein made for metering the radio service on the telephone line meters, a single reading, billing, mailing and collecting will suffice for both services. In the matter of postage alone, since two cent stamps are employed in mailing telephone bills, the saving in a city of 10,000 subscribers would amount to $200 a month or $2400 per annum; and the countrywide postage saving on the basis of estimated present radio use would amount to $40,000 per month or $480,000 per annum. The cost of labor for performing the functions mentioned would be many times this amount, so that by the use of the system herein set forth, it may be estimated that several million dollars per annum of overhead expense will be saved, as compared with separately operated systems, or to put it another way the wire plant will show a large addition to its earnings by the reduction of overhead, entirely aside from direct payment for the radio service. If we assume a district with one B station and 99 C stations located therein, serving approximately 100,000 subscribers, the combined saving on overhead, without any direct earnings, would amount to more than $125,000 per annum, which while perhaps insufficient to pay interest on the capital invested in broadcasting apparatus, would carry all ordinary expense of broadcast operation.

Relay broadcasting by the C stations would ordinarily be done by means of the apparatus symbolized in Fig. 5$^c$, which is adapted to double modulation. It may also be carried on by means of the apparatus of Fig. 7$^b$, for either single or double modulation, the same being appropriately designed to demodulate down to audio frequency, and to amplify and remodulate for reception by the subscribers. For receiving outside items and single modulated waves generally, the apparatus of Fig. 6 and Fig. 7 may also be employed, either one of these taking single modulated waves on its input side and radiating double modulated waves on the output side.

For the selection of items and arrangement of local programs, the operation of station C would be regulated according to the daily dispatch sheets of the A and B stations, (see Figs. 9 and 9$^a$) and the number of primary or intermediate frequencies available, which will be presently explained.

For listening in and supervising reception by the subscribers, the radio station C makes use of the apparatus shown in Fig. 3$^a$, whereby the waves radiated from the transmitting station may be caused to return after demodulation over the wires so as to be audible to the operator through a proper listening apparatus. The apparatus of Fig. 3$^a$ also includes elements such as V, P$^4$, etc., for testing the subscriber's line and instrument. If local batteries are employed at the subscribers' stations, their condition and voltage can be ascertained and if all current is supplied from central as in my prior applications, Serial Number 699,023, filed March 13, 1924, and Serial Number 722,993, filed June 28, 1924, then the resistance of the circuits and their proper tuning can be determined.

For connecting subscribers' wires or studio wires to trunk lines for direct or telephonic communication the radio operator has cord circuits and terminals of the lines, symbolized at P$^3$, J$^3$, J$^2$, etc., in Fig. 3$^a$ and may have equivalent automatic or semiautomatic switching apparatus. The operation is symbolized in Fig. 1$^{aa}$, which shows jacks J' and J$^5$ by means of which the subscriber A' can be trunked to any part of the system without going through the telephone switchboard. I have shown the subscriber's radio receiving set in Fig. 3$^a$ as provided with an extension telephone T'—t', and by means of these and the separate switching apparatus under control of the radio operators it is to be understood that all radio operations, including incidentally telephone trunking or interconnections between radio subscribers can be handled by the radio switchboard, without access to the telephone switchboard or the telephone operators, (except in cases where the same switchboard is employed for both classes of service). I believe this to be original with me and shall claim the same accordingly. The typical and preferred mode of trunking by wire in this system, however, is by means of modulated superaudio frequency carrier current which can be interchangeably imposed on the wired circuits or upon suitable radio frequency carrier waves so as to render transmission and interchange over and between the elements of the mixed system both simple and flexible. This is accomplished by first of all modulating the secondary intermediate frequency in accordance with the sounds which it is desired to transmit; and then sending this modulated carrier current over the trunk circuit or circuits to the point where it is to be utilized. It is to be understood that in such wired transmission of relatively high or superaudio frequencies, the line and trunk circuits are appropriately tuned as indicated in Figs. $3^b$, $3^c$, and $3^d$. It is also to be understood that when transmitted over long trunks, the carrier currents may be relayed and amplified and may be passed through filter circuits when required, all according to principles which are well understood in the art and which have not been illustrated herein as they form no part of the present invention. Thus, for example, in assuming a trunk connection from the head B stations in Fig. 1 to the master station A, it is taken for granted that the wire trunk lines employed for this purpose may be multiplexed and provided with tube relays and amplifiers, the same as at present. If more than one intermediate frequency is assigned to the radio broadcasting corporation for use on wired trunk lines, all such frequencies of carrier current might be confined by agreement to the same trunk or trunks, or if a more flexible agreement were possible, it might be applied over any trunks in the system. This is a detail of administration to be worked out and agreed upon between the telephone company and the broadcasting company; but the principles involved of having certain frequencies or bands of frequencies which can be separately allotted for radio uses only over a system of wired trunk lines, I believe to be original with me and shall claim the same accordingly. This is not to be confused with telephone trunking broadly, even though it be employed for transmitting sounds from a distance to a radio broadcasting studio. The combination I present is more flexible than that, and at the same time more comprehensive, because it includes all the elements of an organized system, whereby modulated intermediate carriers may be forwarded either by means of wires or by means of double modulated carrier waves, from any point in the system to any other point in the system, without losses or distortion due to changes in frequency or tuning. It will be remembered that for receiving purposes the instruments at subscribers' stations are all supposed to be standardized and tuned to one fixed frequency. (This of course is subject to distribution of carrier wave frequencies as expediency may determine and as recommended by the Government. For general purposes it may be assumed here that all subscribers' instruments are tuned fixedly for the same primary carrier wave frequency.) In passing through the relay stations however, the primary carrier wave frequencies change from A to B, from B to C, and from C to subscribers D. Thus, if the sending station B should vary the frequency of the C carrier wave transmitted, this would not affect the intermediate wave frequency or the audio modulations, and so long as C uses the proper frequency D, for the subscribers, the original intermediate waves formed and modulated at the point of origin, would be available in the subscriber's tuned local circuit, the second detector circuit shown in Figs. $3^a$ and 6. On the other hand, suppose there be variations in the carrier frequency employed by C in broadcasting to the subscriber's station D in Figs. $3^b$, $3^c$, $3^d$, and $3^e$, the subscriber's station is shown provided with means to tune the antenna circuit as well as the input circuit of the first tube 85. Thus the variation in primary carrier wave frequency sent from C could be compensated, but the intermediate wave frequency and the audio modulations thereon are unaffected. As a matter of convenience, subscribers' instruments, in Figs. 6, and $3^a$ and $3^f$ may all be tunable within a certain band of frequencies, to offset any momentary irregularity or variation in transmission wave length from C, as well as to permit reception of single modulated waves. In making use of intermediate frequencies, both by trunking and by double modulation of primary carrier waves, it is therefore important that the intermediate wave frequencies be maintained constant and exact throughout the system. For this purpose, a part of every program should be sent out from station A, or at certain fixed times, a tuning wave of master frequency should be sent out throughout the entire system from station A, preferably carrying a definite audio signal to identify it. Such transmission of standard tuning frequencies is already practiced in respect of pure radio waves, by the Bureau of Standards at Washington, D. C., and it has been proposed by the commercial companies also to transmit standard frequency radio waves from a master station to subsidiary stations, in order that distribution of frequencies may be accomplished by means of harmonics taken therefrom. I do not know however of any use of an intermediate frequency master wave distributed over a system, particularly a mixed system of wire and radio links, for tuning purposes. I believe therefore that this is original with me and shall claim the same accordingly. Further than this, inasmuch as modulation of intermediated frequencies may take place at the B stations or even at the C stations by the use of modulator 64 in Fig. $1^{aa}$ or the circuit of Fig. $5^{aa}$, and as there will be many of these stations throughout the system, with a corresponding possibility of error, it is to be particularly understood that I contemplate the use of the long or intermediate frequency master wave sent out from station A for the

250. RADIANT ENERGY.

purpose of calibration or tuning to resonance therewith of all the long wave oscillator circuits 159, 160 and 161 of Fig. 5aa or their equivalents. As a matter of fact, the tuned filter coupler 161 will be calibrated by means of this master wave, and in so calibrating a detector set such as that shown in Fig. 3f may be employed. A convenient method of doing this is to receive the short wave carrying the master long wave on the antenna 28 of Fig. 3f, (this apparatus being assumed as located for such purpose at a B or C station having a transmitter such as that shown in Fig. 5aa to be calibrated), then demodulating through detector tube 85, and tuning the coupler 135—136, put the master wave on the grid circuit of tube 85a and the audio signal thereof in the receiver 133. Having thus tuned the secondary or intermediate wave circuit, the primary and antenna circuit 28—29 can then be retuned to the frequency of the short carrier wave being sent from antenna 57, (Fig. 5aa) and the long wave from the oscillator 158 can then be adjusted in frequency by tuning its circuit to give maximum sharpness in the receiver 133 of the test set. Thus the circuits shown in Figs. 5aa and 3f, or their equivalents can be used for calibration throughout the system with a master tuning wave sent either over the wired trunks or by pure radio through the ether. In either case the pitch or frequency of the long wave transmitted will be identically the same; and its distribution over the system may follow the same channels as any other broadcasting, viz. by pure radio from A to B, relayed from B to C, and again relayed from C to D to test out the subscribers' circuits. Any dissonance detected in the last link between C and D, would be reported at once, as sufficiently serious to receive immediate attention, because all tuning for intermediate frequency or long waves should be definite and fixed in the receivers, and therefore any variations must be taken care of at the sending stations. This has nothing to do with the antenna. I consider this method of calibrating and tuning a system to be original with me and shall claim the same accordingly.

As an alternative method, I may permanently impose the master long wave at superaudio frequency on all the relay stations through the trunks, to excite oscillator or more correctly amplifier tubes so as to produce intermediate frequency or long waves, which may then be modulated, amplified and transmitted in the manner shown herein or any other desired or suitable manner. To accomplish this, the only change in the circuit of Fig. 5aa would be to disconnect the grid circuit from the plate circuit of the long wave oscillator 158, and connect said grid circuit through a suitable tuned filter coupler (such as 136, 136a, 137 and 138 of Fig. 3f) to the trunks carrying the master wave, or through coil 135 to the first detector circuit 127—128 for reception by pure radio. The tube 158 will then be controlled as to its frequency of oscillation by the master wave, which may be received either through the tuned coupler from a trunk line, or through the detector circuit 127—128, etc. from the antenna 28. In this way a master frequency sent out through the system by either long waves over the trunks, or double modulated short waves through the ether, can be used permanently to excite and regulate every long wave transmitter or generator in the system. As described, the B stations would relay the master wave on a short wave carrier to the C stations, maintaining this service constant while the program was in force, but if the master long wave be transmitted over wire trunks, then of course to that extent the wire trunks would be in permanent use for radio. This mode of actuating transmitter generators in synchronism by a distributed master wave applies not only to the circuit of Fig. 5aa but to any and all of the oscillators disclosed in the system, the frequency of the master wave being determined according to the desired frequencies of oscillation in the transmitting tubes. I consider this method and type of apparatus for practicing it to be original with me and shall claim the same accordingly.

Figure 3A:
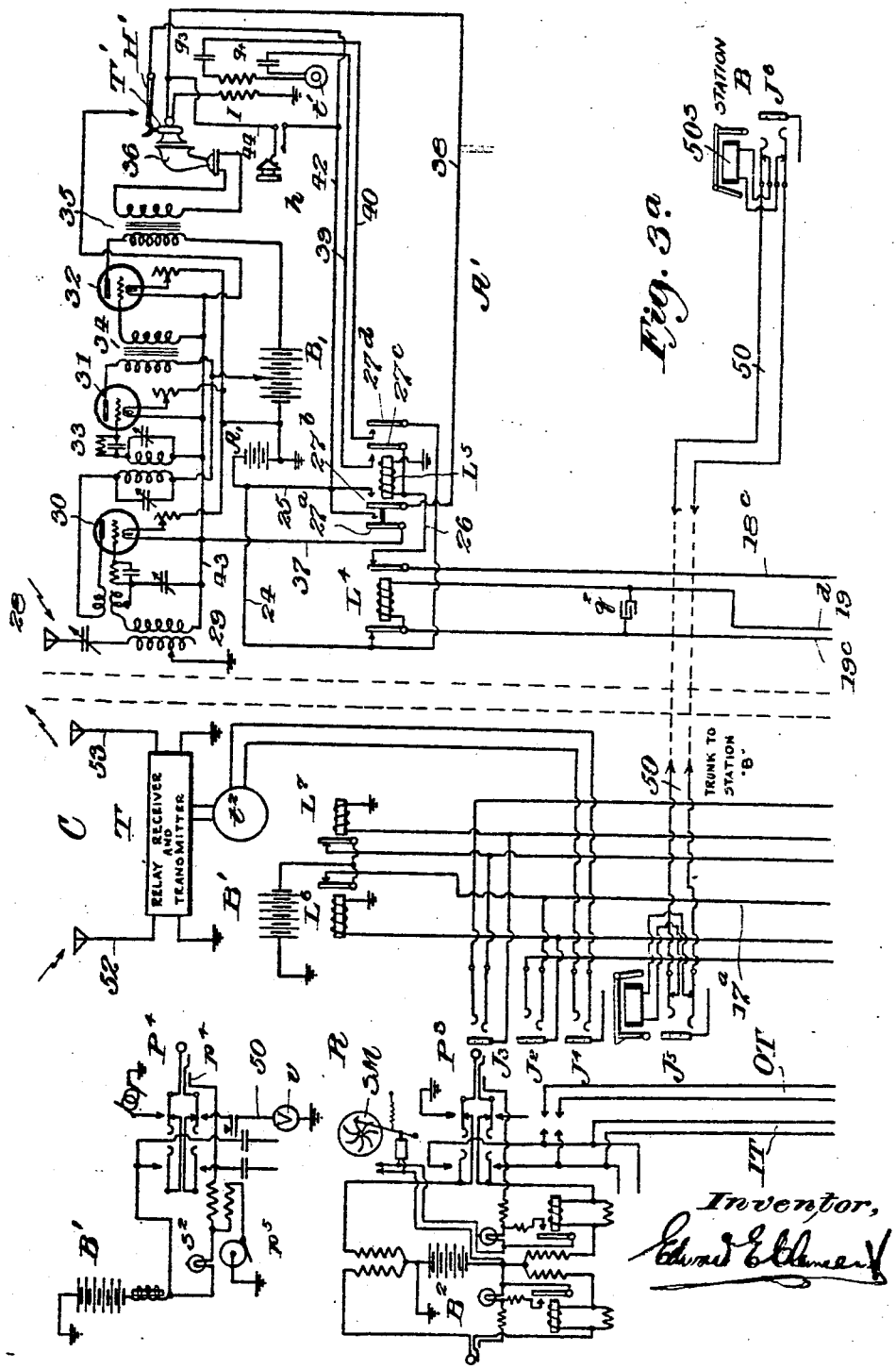
Fig. 3d is a diagram of a further modification showing the said cord circuit provided with the same elments as in Fig. 3c except the battery which is in two units, one for talking and telephone signaling, and the other for the detector tube plate circuit.
Fig. 3e is a schematic diagram showing the relation of units of any type connected up to perform the functions of the circuits shown in Figs. 3b, 3c, and 3d.
Fig. 3f is a circuit diagram of a subscriber's station, as for example, a station on a PBX or branch exchange switchboard, which can receive radio waves on an antenna, and is also equipped to receive the same over the wired line from the central station to which it is connected. This is a modification of the branch exchange arrangement shown in Figs. 2a and 2aa.
Fig. 3g is a modification of the complementary substation and central office apparatus for effecting reception at the substation with central office supervision.
Fig. 3h is a further modification of the complementary substation and central office apparatus in which only the audio signal currents are sent over the subscriber's line.

For rendering special service by broadcasting out with wire return the C stations are provided with modulating transmitters of the type symbolized in Fig. 5a, the jack $J^{10}$ being used to plug up the telephone circuits of the subscriber, either simultaneously or individually, or perhaps in groups, as the necessity of the case may dictate. The operator must of necessity preside over any such group meeting acting as a monitor while some one of the number of subscribers may act as presiding officer if desired. His line would then be plugged up to jack $J^{10}$ in Fig. 5a and everything he said would be conveyed to the other subscribers by the pure radio waves broadcast from the antenna shown. The other subscribers would then be similarly plugged up by the operator as called upon. A better method and one which I prefer, is to connect the group through the multiples to the operator's circuit (see Fig. 3a) and thus maintain connection with them over the wires, as well for listening in on their radio receiving instruments as for receiving replies. The operator of course can speak to all of them through the transmitter 150, and any one of them can be put on the jack $J^{10}$ by the operator to speak to all the others. The details of such a connection may be varied in numerous ways within the knowledge of those skilled in this art and in the telephone art. As a concrete example, assume a chess club meeting to be called, the game scheduled would be between particular parties and these would be plugged up together with the presiding officer so that the plays could be announced by the players themselves to all in the group. The presiding officer's comments and his communications to individual members will thus go out broadcast, and be received by all the subscribers by pure radio. In the meantime, the operator can communicate through the transmitter 150, and can listen over the line by means of a usual listening key, by receiving the audio waves from any subscriber's radio receiving apparatus, as shown in Fig. 3ª. If it be desired to have the persons engaged hear the applause of the audience, means may be provided to plug up all the lines, so that all sound waves coming over all the wires in the group will be broadcast. If the arrangement of Figs. 3ᵇ, 3ᶜ, and 3ᵈ be employed, where the subscriber demodulates the short wave carrier and sends up the long waves to central, then as many lines may be coupled up on the radio switchboard as desired, by simply providing a long cord, or a trunk line, with multiple plugs to take off long waves through the filter couplers. This would have the advantage of not requiring any physical connection with the telephone lines as such; and in such case broadcasting of the long waves brought in would be accomplished through a transmitting set such as that shown in Fig. 5ᵇᵇ, a common trunk to which all the group of subscribers are coupled being connected to the jack J⁹ of said figure. In giving special group service in this way, either special short wave carrier frequencies should be employed, alloted for the time being to such groups, or special intermediate or long wave frequencies should be alloted to them and modulated on the standard short wave D frequency carrier. In such case the apparatus of Figs. 3ᶜ and 3ᵈ could be used to great advantage, because the standard plugs P¹⁴ and P¹⁵, with their circuits, could be replaced by special plugs, each carrier and filter coupler 115ª—117ª, tuned to the special intermediate frequency alloted for the time being to the particular group.

For metering the service, the arrangement shown in Fig. 3ᵇ is typcial of a number of such arrangements that can be employed, but all of this work is done at the C stations, so far as the subscribers are concerned. I do not specifically claim the metering circuits and apparatus herein, the same being described and claimed in my copending applications, Serial Number 581,831, filed August 14, 1922, Serial Number 583,560, filed August 22, 1922, Serial Number 691,825, filed February 9, 1924, and Serial Number 732,797, filed August 18, 1924.

In Fig. 3ᵇ I have shown an automatic commutator $g'$ and an operator's key $g$ for connecting the metering generator in the local or cut off circuit 19ᵇ to a line taking radio service, so that the telephone line meter LM may be energized at intervals determined by the speed and construction of the commutator $g'$. By this method, radiophone time use is charged for in telephone call units. The adjustment of relative unit values between the radio use and the telephone use is not attempted as a finality, because it will be determined by some mutual adjustment owing to the necessity for distribution of profits. In other words, if the telephone rates come down because of increased earnings through the radio service, then the rate of charging in telephone call units for radio service will have to be increased, in order to maintain a parity. Such a result is likely to follow the introduction of combined service, such as herein described.

Where all recording is done on the same meters, as in Fig. 3ᵇ, it has already been pointed out that reading the meters, recording, bookkeeping, billing and collecting can all be performed by the same force and at the same expense required for telephone service alone. The savings by this method have also been pointed out. Several other aspects of this point are to be considered, including the metering or recording of service between central stations and the allocation of charges based thereon; the proper division of gross receipts, as between the telephone administration and the radio administration; and the separation of radio and telephone charges in monthly statements to the subscribers when the subscribers demand it, or where it is required by law. These points will be further discussed presently.

The installing, inspecting, testing and maintaining of subscribers' station equipment is all for the C stations. It should be pointed out however that where a subscriber's telephone line terminates in a telephone exchange different from that which constitutes or is associated with the C station for that area, maintenance, equipment, testing, etc. would be for the nearest central station, by preference, whether a broadcasting station or not. There is another reason for this viz: that the subscriber looks to his own central station for maintenance of his telephone instrument, and it is good practice to unify and not divide in cases of this kind. For this reason, if the radio administration be in the hands of a separate corporation, the actual physical work in connection with the subscriber's station and line equipment, would be in the hands of his local wire exchange. It might be added that to be constant, and in accordance with the best practice, all subscribers' station

250. RADIANT ENERGY.

equipment should belong to those who install it, viz, the telephone companies. The radio corporation gives programs, operates the central office equipment, but for this purpose preferably rents or leases the wire switchboard instrument equipment from the telephone company. The great advantage of this will appear in connection with the discussion of charges and finance.

As records compiling, editing, and publishing of the radio programs, this is necessarily in the hands of the C stations for their respective areas. Nation wide announcements may be briefly broadcasted over the entire system, local announcements may be similarly broadcasted from B stations and C stations respectively; but time, service, and copper are all too valuable in an organized system, to make any sufficient announcement of regular programs. These should be determined far enough in advance as indicated by the daily dispatch sheets as shown in Figs. 9, 9$^a$, and 9$^{aa}$, to be interchanged by mail or by wire reports run through at times when the wires are otherwise idle. Artists and performers or lecturers are booked up at A, B and C stations respectively, according to their national, divisional, district or local value. These bookings may be divided into several classes, as for example: (a) permanent attractions, including artists and musical organizations of established standing, lecturers, etc. These have permanent numbers on all the dockets of the A, B, and C stations, and can be used in forming permanent programs days, weeks or months ahead. (b) temporary attractions, due to public notoriety, or some other interest. These get star numbers on all dockets and according to their rank, of national, district or local, they are inserted on programs by A, B or C stations, respectively. (c) news items, and other purely ephemeral matters, of interest, only at the moment, which are not carried on the dockets, except as blanks to be filled, which blanks however may be given regular numbers for convenience in wire communications. (d) emergencies and disasters of such character as to have the right of way over all other items. These are not booked, but may be carried in blanks as by the press associations. For example, photographs and other materials concerning prominent people, occasions, etc., locations where earthquakes have occurred and may occur again, etc., are kept up to date, in order, and numbered permanently for ready reference. (e) events of national importance, and affairs of the National Government. These cannot be docketed, but are carried with a double star, and preferably given one number which suffices to clear the air and if necessary take over the entire system with or without notice.

From the foregoing, it will be evident that communication with the subscribers is from the C stations, not only in broadcasting and over telephone lines, but through the press and by the means of advertising. Nevertheless, according to the nature of the items which are certified to the C stations for their use, either by relaying or direct, approval of A or B stations must be obtained before varying any part of the main program.

Returning now to the questions of metering and finance, as between the radio administration and the telephone administration particularly, the first question to be considered is how to satisfy the subscriber who demands a division of his radiophone and of his telephone accounts. The simplest method is the best, and that which presents itself as the most available is also one of the earliest methods of metering known in the telephone art. This is to provide a simple counting device at the subscriber's station stepping around a number device or devices as in a Veeder counter. Meters of this sort actuated by the switchhook of telephone instruments are well known in the art; and a Veeder counter of this type may be attached to any form of switch adapted to control the radio receiving instrument. By providing this counting instrument with a stepping magnet included in the radio battery circuit from central, a momentary break in the line made simultaneously with the closure of the line meter at the radio switchboard, would actuate the subscriber's meter so that it would show the time use of this radiophone, in telephone message units. Another method is to apply the counting meter to the subscriber's telephone instrument, instead of the radiophone so that it will record his telephone calls in exactly the same manner as the line meter at the central station. To do this, the meter must register additional units for messages exceeding the three minute or other minimum length of time, which is now quite generally fixed in exchanges throughout the country. One way of accomplishing this is to make the operator's key in the telephone cord circuit of the subscriber's answering operator, momentarily send high potential current from the usual meter generator Gt (see lower part of Fig. 3$^b$), to line as well as through the central office meter circuit. To take advantage of this the high wound meter magnet at the subscriber's station might be connected across the line while the subscriber is talking only.

Another, and a preferable method if the matter of expense be disregarded, is to duplicate the line meters LM (Fig. 3$^b$) at the central station, providing each line with one meter for telephone calls, and another meter for radiophone calls or time use. In such case the wire 19$^b$ would have to be duplicated, so that the radio meter would have its own separate wire loading from the test thimbles of the radio jacks $J^{18}$. The twin plug arrangement of Fig. $3^b$ would be eminently suited to this arrangement since the wire 298 would then pass parallel to the wire $19^b$, and connect with the winding 299 on a separate radio line meter, without other change of the circuits. The objection to this arrangement is the first of installation, and the double cost of maintenance.

Quite as important as the satisfying of the subscribers or complying with the law in respect to metering, is the matter of adjustment of accounts and settlements between the radio administration and the telephone administration using the same wires. The first answer is that if it be the same company operating both services, no division of receipts or mutual accounting for profits need be made. Although this would not be strictly true, in any event, we may pass it for the reason that in practice, in this country at least, two operating organizations not under the same control will probably be required, and therefore accountings at regular intervals must be made. The primary reason for this is that whereas telephone service is a public utility, and therefore comes under the jurisdiction of Federal and State Public Utility Commissions, and is also a common carrier, radio broadcasting service is neither a public utility nor a common carrier, but on the contrary is a combination of a news service and an amusement enterprise. Neither of these comes under the interstate or intrastate commerce laws. What is contemplated in this system, and what must be carried out in any system to be successful on an organized scale, is the production and supply of news, intelligence, technical matters and amusements by an organization formed for that purpose, which leases or otherwise acquires facilities for carriage and distribution of its product over and throughout the geographical area it wishes to serve.

Assuming, then, that the two services are separate, but switchboard and other operation requiring technical handling is in the hands of the wire company, it is obvious that periodical accountings must be had. For this purpose, it is necessary to know the total time use of the radio service of each class, and the total use of the telephone service for the same period. For a general accounting, details would not be necessary. Thus, a message meter of the type LM in Fig. $3^b$, for each operator's position of the switchboard herein typified, and having a branch from its coils 299—300 to the meter button of each one of the cord circuits on its position, would record all the telephone calls, including extra charges on that position, it being evident that an operator would not press two meter buttons at the same instant. This is indicated in Fig. $3^b$ at PM, which designates a position meter reading in totals of calls of that position.

Inasmuch as the recording of two classes of service on the same telephone line meter is new, the necessity for distributing charges recorded is also new, and I believe the arrangement thus specified to be original with me and shall claim the same accordingly.

Another means which traffic managers have been accustomed to rely upon for supplementing their peg counts and message meter records is the record of the total current consumption in the lines or switchboard circuits, which under equal conditions should be proportionate to the traffic load at all times. This record is usually in the form of a Bristol recording dial sheet, taken from a station meter connected in the main bus circuits so as to record the total current consumption for the station. I propose to use this principle for a check against the message meter record in effecting settlement between the radio administration and the telephone administration in this system. Telephone use may be ascertained by position meters, as above stated, and is recorded in message units each equivalent to one three minute conversation. Radio time use might be separately recorded in this way, using a position meter, or a meter of the type LM for each cord or connective circuit on the radio switchboard. I consider it preferable however to connect a recording ammeter in the main battery bus connection to the supervisory lamps (see 105 of Fig. $3^b$) or some other piece of apparatus which has a constant resistance and a constant current flow. This is indicated at SM in Figs. $3^a$ to $3^c$ inclusive. I have also indicated at SM′ in Fig. 3 a station meter to record the total current flow through the lamps $s'$ or their shunt circuits for telephone connections, thus making a parallel record to that of the radio service. By plotting the curves thus developed on straight line section sheets, a direct comparison between the total radio time use and the total telephone time use can be made with reasonable accuracy as a check against the position meters and the line meters above described. I believe all of this arrangement for divisional accounting with separation of two services metered in common, to be new and original with me, and shall claim the same accordingly.

Accurate metering of the radio service is of great importance, aside from the matter of charges based thereon. As hereinbefore stated, the telephone load curve has a fairly constant characteristic shape, with very well developed peaks at certain hours and valleys at certain other hours. In order to take full advantage of all the benefits resulting from combined wire and radio operation, and especially in order to realize all the profits that should rightly flow from such an economical administration of the wire plant, the radio traffic load curve must be adjusted to the telephone load curve, and careful studies made of the reactive effect of each service upon the other. Thus, it may be expected that to a certain extent use of the telephones will be modified when the use of the radiophone becomes organized and habitual; and similarly where the radiophone and the telephone are associated together, the use of the radiophone will frequently be postponed until times when the telephone is not in use, and vice versa. In advance of any accurate body of data however, by which careful comparisons can be made, it is possible to take existing telephone traffic curves and apply assumed radio traffic curves thereto, with a view to showing what can be accomplished, and deducing what may be further expected by way of regulating and regularizing the radio traffic, and the telephone traffic incidentally.

In Figs. 8, 8$^a$ and 8$^{aa}$, I have therein shown three characteristic telephone traffic diagrams, the telephone traffic curve in each case being plotted in solid black lines, and an assumed radio traffic curve for the same body of subscribers, and the same time, in dotted black lines. Fig. 8 shows the curve in a single exchange in a large city. Here the telephone load at midnight is falling and continues to fall until 5 a. m., when it again picks up and at 10 a. m. reaches its maximum for the day. The noon depression is very marked, but not low enough to permit of maximum use of radio facilities, while there is a very decided peak at two and four o'clock with broken but heavy service in between. After four o'clock the load falls rapidly until 7 p. m., after which it may be disregarded until 6 a. m. the next day, so far as radio use is concerned. In assuming the radio curve to complement this telephone curve, the character of the exchange and the inhabitants of the town must be taken into consideration. In a large city, with mixed business and residence telephones on the same board, there will be a combined demand between 7 a. m. and 9 a. m. for news, stock quotations, etc., which will be practically universal after the service is once established, just as the morning newspaper between these hours is almost a universal medium. At the time of greatest telephone use, viz. 10 a. m., the radio load must and will become very low. It will be noted however that it is never carried as low as the telephone load for the reason that there will always be a certain percentage of service constant. The noon recess however, as shown in Fig. 8 will afford a very available opportunity for general use of the radio, which will doubtless be stimulated by employers supplying radio service to the rest rooms and recreation points of their plants. In order to allow for the supplementary peaks at 2 and 4 p. m. the radio load is caused to drop before two o'clock and to rise again in inverse relation to the falling curve of the telephone load from 4 to 8 p. m. when the radio load becomes a maximum, and continues so until an early hour in the morning, indicated as at one o'clock. At this point it falls until normal night load is reached, which I have shown as about ten per cent of the maximum. This load will consist of hospitals, police stations, fire engine houses, railway stations, and all other places where night forces or night vigils are maintained. The hospital load under certain conditions may be heavier than this, and the total load may be increased by regulating the character of the program at points further west. For example, if the exchange of Fig. 8 (which is assumed to be also at C stations) be located in the eastern division, then it would be entirely possible to raise the load between 2 and 6 a. m. from ten per cent to twenty or thirty per cent of the maximum load by putting on special attractions in the Pacific coast division, near the end of their regular evening program. These would come east three hours later and would be beginning when the eastern program was ending. Another feature that would tend to raise this minimum load is dance music, which need not be general, but can be made available if only one orchestra is playing between 2 and 6 a. m.

The main point about these diagrams is that the character of the radio load curve, that is to say, its proportions and the actual distribution of the load, can be regulated to a large extent by the character of the material broadcasted. Thus, the peak at 8 a. m. requires solid stuff, such as stock quotations, news of the day, etc., while the high part of the curve commencing at 8 p. m. calls for entertainment, with only a small percentage of users demanding any serious or heavy material. The noon peak would be stimulated by a mixed program, but in this case it is more than likely that local conditions and requirements will have to be studied because this will be largely absorbed by the labor element, including office labor and factory labor of all kinds. The demand is likely to vary somewhat with the nationality and other characteristics found in particular localities.

Referring to Fig. 8$^a$, I have therein shown a characteristic telephone load curve for an exchange in a small city, and in Fig. 8$^{aa}$, I have shown a similar curve in a suburban exchange. In each case I have traced the radio traffic load curve with a view to complementing the telephone load curve, as above explained, so as to take full advantage of the use of the wires at all times without interference.

Fig. 8ᵇ shows a set of comparative curves for the four divisions, ed representing the eastern division, cd, the central division, md, the mountain division, and pd representing the Pacific coast division. These curves show the characteristic peaks following each other for the different divisions at intervals of one hour. As a matter of fact they are not quite as regular as this because interconnection between stations of each division with those of other divisions modify the time element of business to a certain extent and render the change more gradual from east to west than could be indicated by four steps only. However, the principle involved is accurately represented, and it is thought that the radio traffic should be distributed with due regard thereto under all circumstances, as the only way to avoid confusion.

It is to be observed in connection with these traffic groups, that while I have shown the telephone curve in its present form, with the independent radio load curve supplementing it, this is not the probable ultimate form of either curve. As a matter of fact, since the use of the radiophone would naturally be confined to times when the telephone was not in use for business purposes, it is equally true that a certain percentage of telephone use, both business and residence, is unnecessary and can be dispensed with. This includes friendly social visiting which of course is more pronounced in residence districts than in business, and also certain classes of communications that could be postponed to other times without detriment. This means that when the radio system is organized and dependable, so that the public has come to feel a reliance upon it, its use will be attended by a certain modification in the telephone load curves, which will undoubtedly manifest itself at first in modification of the peaks. Business and social conditions fix the location of these peaks which will probably remain unchanged, but the desire to use the wires for radio will curtail the unnecessary use of the wires for telephone purposes, greatly to the benefit of both services. This should be specially marked in residence districts where social visiting over the telephone is a vice. In the system proposed herein, the use of the radiophone is made subordinate to the use of the telephone, in so far as the wires are concerned. Hence, since the radiophone is subordinated to the telephone, and since the use of the telephone will therefore be affected to a certain extent by the desirability of the radiophone use, the broadcasting company or companies may actually to a certain extent control the telephone traffic curves by the character of their radio programs at different times. For example, if very attractive offerings be made by radio between twelve and one o'clock it might be expected that telephone use between those hours would be cut down to some extent, the unnecessary calls being obliterated and the necessary calls being so far as possible made earlier or later. In the same way, if the telephone company desired to increase the telephone use at some particular hour, the radio program could be made of such a nature at that hour that the class affecting the telephone curve would not then patronize the radio. For example, if it be desired to concentrate the telephone load between ten and eleven in the morning, stock quotations would not be given at that time, but the program at that time would be made up of items interesting to those who needed them but not such as to attract the average business telephone user. There are certain items which are necessary, though not interesting, which can be put on at different times, for the purpose stated. For example, may be mentioned time signals for jewelers. It is entirely possible to determine the character and amount of the radio load at any time by methods comparable to those used in the earlier day of vaudeville, when "chasers" or inferior acts were put on in order to get rid of the long staying patrons. It should be borne in mind that in accordance with present systems, the radio load is a time use load, and therefore it may and probably will be desirable at times to clear the wires for other purposes.

Referring now to Figs. 9, 9ª, and 9ᵃᵃ, I have shown therein daily dispatch sheets for stations A, stations B and stations C. It has been explained that each of the stations A, B, and C will keep a docket or entry book containing the list of detailed contributors in general to the radio program, each artist or attraction being indicated by a serial number. These numbers will be fixed for all permanent attractions, for convenience in making up programs and also in making reports by wire or otherwise. Up to this point, I have said nothing about the distribution of programs by means of intermediate frequencies, and so it will be understood that these daily dispatch sheets are primarily designed for a system in which the A station transmits on a characteristic primary wave frequency to each of the four divisions, where the master B station has means to reach all the other B stations, as well as its own district C stations direct. It is not necessary that the head B stations should receive and relay the A program, but the B stations in general distribute on such distinctive wave lengths as may be allotted to them to the C stations, and they in turn to the subscribers.

Since this is a double modulation system, specifically, we are afforded the opportunity of multiplying intermediate or long wave frequences on the several primary wave carriers. Thus, A may transmit from the same or several machines, all tuned to the same primary carrier wave, which may be for example, one hundred meters, for the eastern division. These several intermediate wave lengths are filtered out at the B stations after detecting and rectifying the primary carrier wave; and each relay station may have as many of these filter coupler circuits of the type shown in Fig. 5$^{bb}$, as there are intermediate frequencies to select from. Thus, the dispatch sheet of Fig. 9$_a$ can be made up in part from the items selected from the A dispatch sheet shown, and in part from matter originating at station B and indicated by book numbers of the B stations. The same procedure applies to transmission from the stations B to the stations C, the program shown on the daily dispatch sheet in Fig. 9$^{aa}$ being made up in part of items received through B from A, in part of items originating at the station B and in part of items originating at station C. Various combinations of primary frequencies and intermediate or secondary frequencies can be employed for enabling selection to be made, and the number of simultaneous elective programs that can be put out by any one of the three stations A, B, and C is limited only by the number of transmitters with which they are equipped, and the number of intermediate frequencies available to which they are respectively tuned.

Coming to the subscriber's station, the primary wave frequency which he receives is fixed, but referring to Fig. 3$^a$ it will be observed that the filter coupler 33 shown between his first detector 30 and second detector 31 is provided with variable tuning elements, as are also his antenna circuit 28 and his local input circuit 43. The subscriber may therefor select intermediate frequencies by merely tuning his filter circuit 33. In tuning, both sides must match up as well understood by those skilled in the art. Thus initial distribution by station A on several frequencies simultaneously results in selection at station B and relaying of the selected items, plus addition of original items, on several frequencies, all of which afford station C the opportunity of selection plus the addition of original matters, for relaying and transmitting to the subscribers D; while the subscribers in turn by tuning their intermediate wave filter circuits can select any and all of the items desired and reject the others. It is of course possible for all the modulated frequencies at A to be relayed from B to C and from C to the subscribers, using whatever number of primary frequencies and intermediate frequencies are available. This might actually occur when a national program was being carried on which must be condensed in point of time, requiring the transmission of several items at once, from which the ultimate subscriber must select those which he would prefer to hear. I consider this arrangement and the method of operating relay stations in an organized system for purposes of selection of program to be new and original with me and shall claim the same accordingly. This applies as well to subscribers' stations as to the intermediate and A stations, and to the entire system as such.

It is of course understood that any or all of the details, construction and operation thus outlined may be changed and modified as necessity, convenience, and the resources of the art from time to time may dictate or permit, without departing from the scope and purview of my invention. I believe I have disclosed a complete and operative system for the purposes described, which is novel in totality, as well as in its several divisions and parts, and that the methods employed throughout are novel, when considered in an organized system. I do not claim the specific circuits shown except as hereinbefore stated, but I do claim the system of the parts and the method of operating the same, as herein disclosed and I wish it distinctly understood that I contemplate all non-essential changes and modifications which may be made herein.

While the master station has been described as being located near the geographical center of the system, it may be permanently or at times located in any division, for example, at New York in the eastern division, controlling other divisions by wire or by radio relaying repeated from division to division. The master station, wherever located, is for the time being the center of the system.

What I claim is:

1. A general organized wire system comprising local exchange centers connected to subscribers' stations and interconnected by wire trunk lines, in combination with a general organized radio broadcasting system comprising a central master station and a plurality of distributing relay stations all associated with and connected to central stations of the said wire system, and subscribers' stations provided with radio receiving instruments, associated with and connected to subscriber's line equipment of said wire system, together with means for broadcasting from said master station to the intermediate relay stations on a carrier wave frequency fixed and determined with respect to said intermediate relay stations, means at said intermediate relay stations for relaying the modulations thus received on a carrier wave of a different frequency fixed and determined with respect to the next set of receiving stations in order, and means for determining over the wires as between the respective receiving and sending stations, whether the sending stations are respectively in tune with their permanently tuned receiving stations.

2. An organized system of wire communication having subscribers' stations distributed over a wide area, local exchange stations serving said subscribers in aggregated groups, said local stations each connected to each of its subscribers by a wire circuit, and all interconnected over the general area by wired trunk circuits, in combination with subscribers' radio receiving stations distributed over the same area and connected with the same subscribers' line circuits, local radio central stations containing terminals of said lines, and also terminals of said wired trunk lines, and an organized system of broadcast relaying comprising graduated stages of radio relay stations arranged to cover the general area, one stage being the local stations distributing direct to the subscribers on a fixed wave length, and supervising the subscribers' receiving over their wire circuits, the next being an intermediate stage receiving on a fixed wave frequency and distributing to the local stations on a second fixed wave frequency, and so on to a master station broadcasting for the time being.

3. An organized system of radio broadcast distribution, comprising a large number of subscribers served from local distributing central stations, wire connections from each of said local central stations to all of its subscribers, means at local central stations for broadcasting on a fixed carrier wave frequency to subscribers in their respective areas, and a plurality of sets or stages of radio relay stations each set or stage receiving on the same carrier wave length and relaying the modulation on a different carrier wave length fixed for the stage next below it.

4. A general organized wire system and a general organized radio system, comprising subscribers' stations, central stations and wire lines connecting said subscribers' station and said central stations, and other wire lines interconnecting said central stations, with wire transmitting means from any subscriber adapted to directively send sound wave modulations over the wires to any point on the combined system, and radio relay means ranked in stages adapted to broadcast from any point on the system, to all points thereof, by successively repeating the original modulations on successively changing carrier wave frequencies until they reach the subscribers on the carrier wave allotted to them.

5. In an organized wired signal system having a plurality of subscribers' stations divided into local subscribers' groups with a subscriber's service station for each group, radio receiving means at each subscriber's station supervised from its associated service station, a master radio service station for all the subscribers' stations, and radio relay stations arranged to relay signals from said master service station to said subscribers' stations, each sending on fixed carrier wave frequencies allotted permanently to the receiving means of the station next in order below it.

6. The combination of radio broadcasting stations arranged in classes or order of sending, each class or sender sending to the class or order next below it, the number of stations being expanded or enlarged at each stage, and the carrier wave frequency transmitted at each stage being a fixed wave allotted permanently to the next lower order of stations, subscribers' stations connected by wire to local telephone exchanges, said subscribers' stations being grouped with respect to the last class or order of radio sending stations, and having receiving instruments permanently tuned to the sending frequency of said last class or order of sending stations.

7. The combination of radio broadcasting stations arranged in classes or order of sending, each class or sender sending to the class or order next below it, the number of stations being expanded or enlarged at each stage, and the carrier wave frequency transmitted at each stage being a fixed wave allotted permanently to the next lower order of stations, subscribers' stations connected by wire to local telephone exchanges, grouped with respect to the last class or order of radio sending stations, and having receiving instruments permanently tuned to the sending frequency of said last class or order of sending stations, together with means whereby the radio sending stations of the last or local area class may communicate with the subscribers over their telephone wires, for purposes of supervision, control, and to bring in audio frequency signals intended to be put on the system for broadcasting.

8. In an organized wired regional system having a plurality of subscribers' stations divided into subscribers' groups with a subscriber's service station for each group, radio receiving means at each subscriber's station connected with its associated service station for supervision therefrom, those in the same group being tuned to a common wave length, a master radio service station, and means at said subscribers' service stations for transmitting a common signal originating at the master station on different wave lengths in the common area, occupied by several said subscriber's groups, whereby the groups are segregated by wave lengths independently of physical boundaries.

9. In an organized wired signal system having a plurality of subscribers' stations divided into groups arranged to be connected by wire to a subscriber's service station, a radio receiving set at each subscriber's station, arranged to be supervised from its associated subscriber's service station over said wire connection, and means for transmitting a common signal by radio at different wave lengths corresponding to the different wave lengths to which said subscribers' receiving sets are tuned.

10. In an organized wired signal system having a plurality of subscribers' stations divided into groups with a subscriber's service station for each group, radio receiving means at each subscriber's station connected with its associated service station for supervision therefrom, said subscriber's radio receiving means being tuned to different wave lengths of a given band of short wave lengths, each group having a common wave length, means for broadcasting different classes of matter on different intermediate wave lengths of a given band of relatively long waves modulated on different ones of the wave lengths to which said subscribers' receiving sets are tuned, to effect differential distribution among said different groups of subscribers, and means associated with the subscribers' receiving sets for doubly demodulating the short waves received thereby.

11. The method of broadcasting signals to selected receiving stations, which consists in maintaining said stations tuned to a common frequency, broadcasting from a central master station through a series of groups of relay stations to the receiving stations on different carrier waves fixed and determined with respect to the different groups of relay stations and the receiving stations, and supervising the reception at the selected stations from a common point.

12. The method of controlling broadcast distribution to selected subscribers' receiving sets which consists in maintaining different groups of receiving sets tuned to different wave lengths, supervising each group over individual wire connections from a common central station for each group, and transmitting a common signal from the different central stations on different carrier waves corresponding to the respective groups.

13. The method of broadcasting signals to selected receiving stations which consists in maintaining said stations tuned to a given common frequency and broadcasting from a central station, through a series of relay stations to the receiving stations on different primary carrier waves fixed and determined with respect to the tuning of the receiving circuits of said relay stations and said selected receiving stations, the primary carrier waves being all modulated with a common intermediate wave of superaudio frequency lower than the frequency of the primary carrier wave and modulated with a common set of signals.

14. The method of selectively distributing radio broadcasted signals among a plurality of receiving stations through a series of relay stations by double modulation which comprises maintaining said receiving stations tuned to different given primary radio frequencies, maintaining the different relay stations tuned to receive different given intermediate frequency waves on different given primary frequency waves different from the first given primary frequencies and to retransmit the given intermediate frequency on different ones of the first mentioned given primary frequencies, and broadcasting different programs on different combinations of intermediate and primary frequencies to determine the routing of the different programs to and among the receiving stations.

15. The method of selectively distributing radio broadcasted signals among a plurality of groups of receiving stations through a series of relay stations by double modulation which comprises maintaining said groups of receiving stations tuned to different given primary radio frequencies, maintaining the different relay stations tuned to receive different given intermediate frequency waves on different given primary frequency waves different from the first given primary frequencies and to retransmit the given intermediate frequency on different ones of the first mentioned given primary frequencies, and broadcasting different programs on different combinations of intermediate and primary frequencies to determine the routing of the different programs to and among the groups of receiving stations.

16. The method of selectively distributing signals broadcasted by doubly modulated waves to different groups of ultimate receiving stations through a series of stages of groups of relay stations, which comprises maintaining the different groups of ultimate receiving stations tuned to receive on different combinations of high frequency and intermediate frequency waves, maintaining the receiving circuits of each relay station of the group of relay stations in the stage next preceding the ultimate receivers tuned to a common high frequency but to a different one of the same intermediate frequencies of the combinations to which the ultimate receivers are tuned, retransmitting from each relay station the received intermediate frequency on one of the high frequencies to which the ultimate receivers are tuned, and transmitting to the relay stations of the group next preceding the ultimate receiving stations by double modulation on the high receiving frequency common to the group while varying the intermediate frequency from one to another of the different intermediate frequencies to which the different relay receiving circuits are tuned for selection of a relay station and consequently of the group of ultimate receiving stations whose combination of high and intermediate frequencies the selected relay station transmits.

17. The method of selectively broadcasting signals by radio from a primary station through a series of groups of relay stations to different groups of receiving stations which comprises broadcasting the signals from the primary station as relatively low frequency modulations on an intermediate frequency in turn modulated on a high radio frequency, thus forming a doubly modulated wave, maintaining different relay stations tuned to receive doubly modulated waves composed of different combinations of high and intermediate frequencies different for different stations and to retransmit on doubly modulated waves composed of different combinations of high and intermediate frequency waves different for the different stations. maintaining the ultimate receiving stations to which the last order of relay stations transmit tuned to receive doubly modulated waves of different combinations of high and intermediate frequencies different for different groups of receiving stations, and varying the combinations of high and intermediate frequencies transmitted by the primary station.

18. The method of selectively routing radio broadcasting signals from a primary station through a series of two groups of relay stations to groups of receiving stations served by the last group of relay stations which comprises broadcasting the signals from the primary station as relatively low frequency modulations on an intermediate frequency in turn modulated on a high radio frequency, thus forming a doubly modulated wave, maintaining different relay stations tuned to receive doubly modulated waves of different combinations of high and intermediate frequencies, the group of relay stations first in order from the primary station being given different high receiving frequencies and a common intermediate receiving frequency while the second group is given a common high receiving frequency and different intermediate receiving frequencies, retransmitting the intermediate frequencies received by the first group on the common high receiving frequency of the second group, varying the high frequency transmitted from the primary station to determine which relay or relays of the first group will receive and varying the intermediate frequency to determine which relay or relays of the second group will receive.

19. The combination of radio broadcasting stations arranged in classes or order of sending each class or order sending to the class or order next below it, the number of stations being expanded or enlarged at each stage and the carrier wave frequency transmitted at each stage being a fixed wave allotted permanently to the next lower order of stations. subscribers' stations grouped with respect to the last class or order of radio sending stations, and having receiving instruments permanently tuned to a common fixed frequency the same as the sending frequency of the sending station of the last class or order to which the groups of subscribers' stations are related, together with means whereby the radio sending stations of the last order may communicate with their subscribers independently of the broadcasting system for purposes of supervision and to bring in signals intended to be put on the system for broadcasting.

In testimony whereof I hereunto affix my signature.

EDWARD E. CLEMENT.